United States Patent
Ullman et al.

(10) Patent No.: US 9,148,684 B2
(45) Date of Patent: Sep. 29, 2015

(54) ENHANCED VIDEO PROGRAMMING SYSTEM AND METHOD UTILIZING USER-PROFILE INFORMATION

(71) Applicant: OpenTV, Inc., San Francisco, CA (US)

(72) Inventors: Craig Ullman, Brooklyn, NY (US); Jeffrey M. Harrington, Brooklyn, NY (US); Michael R. Abato, White Plains, NY (US); Carl R. Duda, Santa Barbara, CA (US)

(73) Assignee: OpenTV, Inc., San Francisco, CA (US)

( * ) Notice: Subject to any disclaimer, the term of this patent is extended or adjusted under 35 U.S.C. 154(b) by 147 days.

(21) Appl. No.: 14/142,544

(22) Filed: Dec. 27, 2013

(65) Prior Publication Data

US 2014/0189764 A1    Jul. 3, 2014

Related U.S. Application Data

(63) Continuation of application No. 13/041,133, filed on Mar. 4, 2011, now Pat. No. 8,621,541, which is a continuation of application No. 09/409,305, filed on Sep. 29, 1999, now Pat. No. 7,949,722.

(51) Int. Cl.
*H04N 7/173* (2011.01)
*H04N 5/445* (2011.01)
(Continued)

(52) U.S. Cl.
CPC .......... *H04N 21/2665* (2013.01); *G06Q 30/02* (2013.01); *H04L 61/301* (2013.01); *H04L 67/306* (2013.01); *H04N 7/165* (2013.01); *H04N 7/17318* (2013.01); *H04N 21/235* (2013.01);
(Continued)

(58) Field of Classification Search
USPC .............................. 725/46, 50, 117
See application file for complete search history.

(56) References Cited

U.S. PATENT DOCUMENTS

| | | | |
|---|---|---|---|
| 4,572,509 A | 2/1986 | Sitrick | |
| 4,592,546 A | 6/1986 | Fascenda et al. | |

(Continued)

FOREIGN PATENT DOCUMENTS

| | | | |
|---|---|---|---|
| AU | 717399 B2 | 3/2000 | |
| DE | 4427046 A1 | 2/1996 | |

(Continued)

OTHER PUBLICATIONS

"Advanced Television Enhancement Forum Specification (ATVEF)", Comment Draft Version 1.0r1, XP002142688, (Feb. 25, 1999), 24 pgs.

(Continued)

*Primary Examiner* — Kieu Oanh T Bui
(74) *Attorney, Agent, or Firm* — Schwegman Lundberg & Woessner, P.A.

(57) ABSTRACT

Example methods of providing media content via a network are presented. In one example, a user profile and a group profile are accessed. The user profile includes information describing a user of media content, and the group profile includes information describing a group of users of media content. Based on the information of the user profile, the user profile is assigned to the user group, in which the user profile is linked as a child profile to the group profile. Based on the information of the user profile and on the assigning of the user profile to the user group, an item of media content is determined for transmission to a user device of the user. The item of media content is transmitted via the network to the user device.

21 Claims, 11 Drawing Sheets

(51) Int. Cl.

| | |
|---|---|
| *H04N 21/2665* | (2011.01) |
| *G06Q 30/02* | (2012.01) |
| *H04N 7/16* | (2011.01) |
| *H04N 21/235* | (2011.01) |
| *H04N 21/258* | (2011.01) |
| *H04N 21/435* | (2011.01) |
| *H04N 21/442* | (2011.01) |
| *H04N 21/462* | (2011.01) |
| *H04N 21/466* | (2011.01) |
| *H04N 21/4722* | (2011.01) |
| *H04N 21/475* | (2011.01) |
| *H04N 21/4782* | (2011.01) |
| *H04N 21/658* | (2011.01) |
| *H04N 21/81* | (2011.01) |
| *H04N 21/8547* | (2011.01) |
| *H04N 21/858* | (2011.01) |
| *H04L 29/08* | (2006.01) |
| *H04L 29/12* | (2006.01) |

(52) U.S. Cl.
CPC ....... *H04N 21/25891* (2013.01); *H04N 21/435* (2013.01); *H04N 21/44222* (2013.01); *H04N 21/4622* (2013.01); *H04N 21/4667* (2013.01); *H04N 21/4722* (2013.01); *H04N 21/4755* (2013.01); *H04N 21/4782* (2013.01); *H04N 21/6582* (2013.01); *H04N 21/812* (2013.01); *H04N 21/858* (2013.01); *H04N 21/8547* (2013.01); *H04N 21/8586* (2013.01); *H04L 29/12594* (2013.01); *H04L 61/30* (2013.01); *H04L 69/329* (2013.01)

(56) References Cited

U.S. PATENT DOCUMENTS

| | | |
|---|---|---|
| 4,734,764 A | 3/1988 | Pocock et al. |
| 4,877,408 A | 10/1989 | Hartsfield |
| 4,894,789 A | 1/1990 | Yee |
| 4,905,094 A | 2/1990 | Pocock et al. |
| 4,941,040 A | 7/1990 | Pocock et al. |
| 5,014,125 A | 5/1991 | Pocock et al. |
| 5,114,155 A | 5/1992 | Tillery et al. |
| 5,128,752 A | 7/1992 | Von Kohorn |
| 5,140,419 A | 8/1992 | Galumbeck et al. |
| 5,191,410 A | 3/1993 | McCalley et al. |
| 5,208,659 A | 5/1993 | Rhodes |
| 5,243,528 A | 9/1993 | Lefebvre |
| 5,262,860 A | 11/1993 | Fitzpatrick et al. |
| 5,264,933 A | 11/1993 | Rosser et al. |
| 5,282,028 A | 1/1994 | Johnson et al. |
| 5,285,278 A | 2/1994 | Holman |
| 5,291,486 A | 3/1994 | Koyanagi |
| 5,353,283 A | 10/1994 | Tsuchiya |
| 5,359,510 A | 10/1994 | Sabaliauskas |
| 5,365,346 A | 11/1994 | Abumi |
| 5,438,355 A | 8/1995 | Palmer |
| 5,453,794 A | 9/1995 | Ezaki |
| 5,462,275 A | 10/1995 | Lowe et al. |
| 5,479,268 A | 12/1995 | Young et al. |
| 5,481,542 A | 1/1996 | Logston et al. |
| 5,498,000 A | 3/1996 | Cuneo |
| 5,526,035 A | 6/1996 | Lappington et al. |
| 5,534,913 A | 7/1996 | Majeti et al. |
| 5,537,141 A | 7/1996 | Harper et al. |
| 5,539,471 A | 7/1996 | Myhrvold et al. |
| 5,543,849 A | 8/1996 | Long |
| 5,553,221 A | 9/1996 | Reimer et al. |
| 5,557,316 A | 9/1996 | Hoarty et al. |
| 5,564,073 A | 10/1996 | Takahisa |
| 5,570,295 A | 10/1996 | Isenberg et al. |
| 5,572,442 A | 11/1996 | Schulhof et al. |
| 5,579,055 A | 11/1996 | Hamilton et al. |
| 5,585,858 A | 12/1996 | Harper et al. |
| 5,586,257 A | 12/1996 | Perlman |
| 5,586,937 A | 12/1996 | Menashe |
| 5,589,892 A | 12/1996 | Knee et al. |
| 5,593,349 A | 1/1997 | Miguel et al. |
| 5,604,542 A | 2/1997 | Dedrick |
| 5,610,653 A | 3/1997 | Abecassis |
| 5,612,730 A | 3/1997 | Lewis |
| RE35,498 E | 4/1997 | Barnard |
| 5,627,978 A | 5/1997 | Altom et al. |
| 5,633,810 A | 5/1997 | Mandal et al. |
| 5,633,918 A | 5/1997 | Mankovitz |
| 5,637,844 A | 6/1997 | Eiba |
| 5,640,193 A | 6/1997 | Wellner |
| 5,643,088 A | 7/1997 | Vaughn et al. |
| 5,649,284 A | 7/1997 | Yoshinobu |
| 5,659,366 A | 8/1997 | Kerman |
| 5,667,708 A | 9/1997 | Glass et al. |
| 5,668,592 A | 9/1997 | Spaulding, II |
| 5,677,708 A | 10/1997 | Matthews, III et al. |
| 5,679,075 A | 10/1997 | Forrest et al. |
| 5,686,954 A | 11/1997 | Yoshinobu et al. |
| 5,691,986 A | 11/1997 | Pearlstein |
| 5,694,163 A | 12/1997 | Harrison |
| 5,695,400 A | 12/1997 | Fennell, Jr. et al. |
| 5,696,905 A | 12/1997 | Reimer et al. |
| 5,697,844 A | 12/1997 | Von Kohorn |
| 5,710,884 A | 1/1998 | Dedrick |
| 5,724,091 A | 3/1998 | Freeman et al. |
| 5,724,103 A | 3/1998 | Batchelor |
| 5,724,521 A | 3/1998 | Dedrick |
| 5,724,567 A | 3/1998 | Rose et al. |
| 5,729,252 A | 3/1998 | Fraser |
| 5,730,654 A | 3/1998 | Brown |
| 5,734,413 A | 3/1998 | Lappington et al. |
| 5,734,437 A | 3/1998 | Back |
| 5,748,186 A | 5/1998 | Raman |
| 5,748,731 A | 5/1998 | Shepherd |
| 5,757,916 A | 5/1998 | MacDoran et al. |
| 5,758,079 A | 5/1998 | Ludwig et al. |
| 5,759,101 A | 6/1998 | Von Kohorn |
| 5,761,602 A | 6/1998 | Wagner et al. |
| 5,761,606 A | 6/1998 | Wolzien |
| 5,771,381 A | 6/1998 | Jones et al. |
| 5,774,664 A | 6/1998 | Hidary et al. |
| 5,778,181 A | 7/1998 | Hidary et al. |
| 5,779,549 A | 7/1998 | Walker et al. |
| 5,782,692 A | 7/1998 | Stelovsky |
| 5,784,560 A | 7/1998 | Kingdon et al. |
| 5,793,365 A | 8/1998 | Tang et al. |
| 5,796,393 A | 8/1998 | MacNaughton et al. |
| 5,796,952 A | 8/1998 | Davis et al. |
| 5,801,750 A | 9/1998 | Kurihara |
| 5,813,006 A | 9/1998 | Polnerow et al. |
| 5,818,441 A | 10/1998 | Throckmorton et al. |
| 5,819,261 A | 10/1998 | Takahashi et al. |
| 5,823,879 A | 10/1998 | Goldberg et al. |
| 5,832,496 A | 11/1998 | Anand et al. |
| 5,846,132 A | 12/1998 | Junkin |
| 5,848,373 A | 12/1998 | DeLorme et al. |
| 5,848,396 A | 12/1998 | Gerace |
| 5,848,397 A | 12/1998 | Marsh et al. |
| 5,855,516 A | 1/1999 | Eiba |
| 5,861,881 A | 1/1999 | Freeman et al. |
| 5,867,208 A | 2/1999 | McLaren |
| 5,870,558 A | 2/1999 | Branton, Jr. et al. |
| 5,878,222 A | 3/1999 | Harrison |
| 5,878,223 A | 3/1999 | Becker et al. |
| 5,880,720 A | 3/1999 | Iwafune et al. |
| 5,889,950 A | 3/1999 | Kuzma |
| 5,889,951 A | 3/1999 | Lombardi |
| 5,890,906 A | 4/1999 | Macri et al. |
| 5,890,963 A | 4/1999 | Yen |
| 5,892,909 A | 4/1999 | Grasso et al. |
| 5,894,556 A | 4/1999 | Grimm et al. |
| 5,905,865 A | 5/1999 | Palmer et al. |
| 5,907,322 A | 5/1999 | Kelly et al. |
| 5,907,680 A | 5/1999 | Nielsen |
| 5,912,700 A | 6/1999 | Honey et al. |

(56) References Cited

U.S. PATENT DOCUMENTS

| | | |
|---|---|---|
| 5,913,040 A | 6/1999 | Rakavy et al. |
| 5,917,725 A | 6/1999 | Thacher et al. |
| 5,918,009 A | 6/1999 | Gehani et al. |
| 5,918,014 A | 6/1999 | Robinson |
| 5,926,179 A | 7/1999 | Matsuda et al. |
| 5,929,849 A | 7/1999 | Kikinis |
| 5,929,850 A | 7/1999 | Broadwin et al. |
| 5,933,822 A | 8/1999 | Braden-Harder et al. |
| 5,940,082 A | 8/1999 | Brinegar et al. |
| 5,940,595 A | 8/1999 | Reber et al. |
| 5,941,774 A | 8/1999 | Takemoto et al. |
| 5,947,747 A | 9/1999 | Walker et al. |
| 5,948,040 A | 9/1999 | DeLorme et al. |
| 5,951,636 A | 9/1999 | Zerber |
| 5,954,798 A | 9/1999 | Shelton et al. |
| 5,956,038 A | 9/1999 | Rekimoto |
| 5,961,603 A | 10/1999 | Kunkel et al. |
| 5,973,685 A | 10/1999 | Schaffa et al. |
| 5,978,833 A | 11/1999 | Pashley et al. |
| 5,987,454 A | 11/1999 | Hobbs |
| 5,987,523 A | 11/1999 | Hind et al. |
| 5,999,664 A | 12/1999 | Mahoney et al. |
| 5,999,929 A | 12/1999 | Goodman |
| 6,005,561 A | 12/1999 | Hawkins et al. |
| 6,006,252 A | 12/1999 | Wolfe |
| 6,006,265 A | 12/1999 | Rangan et al. |
| 6,009,458 A | 12/1999 | Hawkins et al. |
| 6,012,083 A | 1/2000 | Savitzky et al. |
| 6,018,768 A | 1/2000 | Ullman et al. |
| 6,023,729 A | 2/2000 | Samuel et al. |
| 6,026,375 A | 2/2000 | Hall et al. |
| 6,029,045 A | 2/2000 | Picco et al. |
| 6,029,172 A | 2/2000 | Jorna et al. |
| 6,029,195 A | 2/2000 | Herz |
| 6,044,403 A | 3/2000 | Gerszberg et al. |
| 6,047,235 A | 4/2000 | Hiyokawa et al. |
| 6,049,821 A | 4/2000 | Theriault et al. |
| 6,055,569 A | 4/2000 | O'Brien et al. |
| 6,057,856 A | 5/2000 | Miyashita et al. |
| 6,061,738 A | 5/2000 | Osaku et al. |
| 6,065,059 A | 5/2000 | Shieh et al. |
| 6,075,527 A | 6/2000 | Ichihashi et al. |
| 6,080,063 A | 6/2000 | Khosla |
| 6,081,830 A | 6/2000 | Schindler |
| 6,082,887 A | 7/2000 | Feuer et al. |
| 6,094,677 A | 7/2000 | Capek et al. |
| 6,098,085 A | 8/2000 | Blonder et al. |
| 6,101,180 A | 8/2000 | Donahue et al. |
| 6,102,797 A | 8/2000 | Kail |
| 6,102,969 A | 8/2000 | Christianson et al. |
| 6,108,703 A | 8/2000 | Leighton et al. |
| 6,112,181 A | 8/2000 | Shear et al. |
| 6,112,212 A | 8/2000 | Heitler |
| 6,119,165 A | 9/2000 | Li et al. |
| 6,122,647 A | 9/2000 | Horowitz et al. |
| 6,122,658 A | 9/2000 | Chaddha |
| 6,126,547 A | 10/2000 | Ishimoto |
| 6,128,482 A | 10/2000 | Nixon |
| 6,131,120 A | 10/2000 | Reid |
| 6,134,584 A | 10/2000 | Chang et al. |
| 6,138,144 A | 10/2000 | DeSimone et al. |
| 6,144,848 A | 11/2000 | Walsh et al. |
| 6,144,991 A | 11/2000 | England |
| 6,151,626 A | 11/2000 | Tims et al. |
| 6,163,803 A | 12/2000 | Watanabe |
| 6,182,072 B1 | 1/2001 | Leak et al. |
| 6,182,116 B1 | 1/2001 | Namma et al. |
| 6,192,140 B1 | 2/2001 | Reinhard et al. |
| 6,192,394 B1 | 2/2001 | Gutfreund et al. |
| 6,193,610 B1 | 2/2001 | Junkin |
| 6,199,014 B1 | 3/2001 | Walker et al. |
| 6,199,045 B1 | 3/2001 | Giniger et al. |
| 6,204,842 B1 | 3/2001 | Fujii |
| 6,205,582 B1 | 3/2001 | Hoarty |
| 6,253,228 B1 | 6/2001 | Ferris et al. |
| 6,260,192 B1 | 7/2001 | Rosin et al. |
| 6,266,649 B1 | 7/2001 | Linden et al. |
| 6,275,705 B1 | 8/2001 | Drane et al. |
| 6,278,942 B1 | 8/2001 | McDonough |
| 6,279,007 B1 | 8/2001 | Uppala |
| 6,288,753 B1 | 9/2001 | DeNicola et al. |
| 6,289,362 B1 | 9/2001 | Van Der Meer |
| 6,292,780 B1 | 9/2001 | Doederlein et al. |
| 6,297,748 B1 | 10/2001 | Lappenbusch et al. |
| 6,298,330 B1 | 10/2001 | Gardenswartz et al. |
| 6,317,722 B1 | 11/2001 | Jacobi et al. |
| 6,317,780 B1 | 11/2001 | Cohn et al. |
| 6,317,791 B1 | 11/2001 | Cohn et al. |
| 6,326,982 B1 | 12/2001 | Wu et al. |
| 6,327,574 B1 | 12/2001 | Kramer et al. |
| 6,330,592 B1 | 12/2001 | Makuch et al. |
| 6,353,933 B1 | 3/2002 | Love |
| 6,366,914 B1 | 4/2002 | Stern |
| 6,397,220 B1 | 5/2002 | Deisinger et al. |
| 6,412,011 B1 | 6/2002 | Agraharam et al. |
| 6,424,979 B1 | 7/2002 | Livingston et al. |
| 6,425,012 B1 | 7/2002 | Trovato et al. |
| 6,442,590 B1 | 8/2002 | Inala et al. |
| 6,442,598 B1 | 8/2002 | Wright et al. |
| 6,442,687 B1 | 8/2002 | Savage |
| 6,457,010 B1 | 9/2002 | Eldering et al. |
| 6,460,180 B1 | 10/2002 | Park et al. |
| 6,463,585 B1 | 10/2002 | Hendricks et al. |
| 6,466,929 B1 | 10/2002 | Brown et al. |
| 6,466,969 B1 | 10/2002 | Bunney et al. |
| 6,480,885 B1 | 11/2002 | Olivier |
| 6,486,892 B1 | 11/2002 | Stern |
| RE37,957 E | 1/2003 | Garfield |
| 6,513,069 B1 | 1/2003 | Abato et al. |
| 6,526,041 B1 | 2/2003 | Shaffer et al. |
| 6,546,387 B1 | 4/2003 | Triggs |
| 6,571,234 B1 | 5/2003 | Knight et al. |
| 6,577,716 B1 | 6/2003 | Minter et al. |
| 6,578,025 B1 | 6/2003 | Pollack et al. |
| 6,606,657 B1 | 8/2003 | Zilberstein et al. |
| 6,611,872 B1 | 8/2003 | McCanne |
| 6,625,624 B1 | 9/2003 | Chen et al. |
| 6,643,691 B2 | 11/2003 | Austin |
| 6,654,735 B1 | 11/2003 | Eichstaedt et al. |
| 6,661,372 B1 | 12/2003 | Girerd et al. |
| 6,675,162 B1 | 1/2004 | Russell-Falla |
| 6,701,362 B1 | 3/2004 | Subramonian et al. |
| 6,725,159 B2 | 4/2004 | Krasner |
| 7,568,210 B2 | 7/2009 | Asmussen |
| 7,949,722 B1 | 5/2011 | Ullman et al. |
| 8,621,541 B2 | 12/2013 | Ullman et al. |
| 2001/0000537 A1 | 4/2001 | Inala et al. |
| 2002/0056129 A1 | 5/2002 | Blackketter et al. |
| 2002/0112002 A1 | 8/2002 | Abato |
| 2002/0156909 A1 | 10/2002 | Harrington |
| 2002/0188943 A1 | 12/2002 | Freeman et al. |
| 2011/0219421 A1 | 9/2011 | Ullman et al. |

FOREIGN PATENT DOCUMENTS

| | | |
|---|---|---|
| DE | 4431438 A1 | 3/1996 |
| DE | 19545882 A1 | 6/1997 |
| EP | 0163577 A2 | 12/1985 |
| EP | 0314572 A2 | 5/1989 |
| EP | 0562221 A1 | 9/1993 |
| EP | 0673164 A1 | 9/1995 |
| EP | 0757485 A2 | 2/1997 |
| EP | 0805598 A1 | 11/1997 |
| EP | 0837609 A1 | 4/1998 |
| EP | 0879536 A1 | 11/1998 |
| EP | 0757485 A3 | 3/1999 |
| EP | 0952539 A | 10/1999 |
| EP | 0952539 A2 | 10/1999 |
| EP | 0982943 A2 | 3/2000 |
| EP | 1089201 A1 | 4/2001 |
| GB | 2132856 A | 7/1984 |
| GB | 2325537 A | 11/1998 |
| GB | 2327837 A | 2/1999 |
| GB | 2347055 A | 8/2000 |

(56) References Cited

FOREIGN PATENT DOCUMENTS

| | | |
|---|---|---|
| GB | 2350213 A | 11/2000 |
| GB | 2359708 A | 8/2001 |
| GB | 2359958 A | 9/2001 |
| GB | 2359449 B | 5/2002 |
| JP | 4127688 A | 4/1992 |
| JP | 5176306 A | 7/1993 |
| JP | 7288606 A | 10/1995 |
| JP | 7307813 A | 11/1995 |
| JP | 8008820 A | 1/1996 |
| WO | WO-9306675 A1 | 4/1993 |
| WO | WO-9307713 A1 | 4/1993 |
| WO | WO-9311617 A1 | 6/1993 |
| WO | WO-9322877 A2 | 11/1993 |
| WO | WO-9413107 A1 | 6/1994 |
| WO | WO-9607270 A1 | 3/1996 |
| WO | WO-9608923 A1 | 3/1996 |
| WO | WO-9613124 A1 | 5/1996 |
| WO | WO-9702699 A1 | 1/1997 |
| WO | WO-9722207 A1 | 6/1997 |
| WO | WO-9727546 A1 | 7/1997 |
| WO | WO-9729591 A1 | 8/1997 |
| WO | WO-9733414 A2 | 9/1997 |
| WO | WO-9823080 A2 | 5/1998 |
| WO | WO-9829956 A2 | 7/1998 |
| WO | WO-9944159 A | 9/1999 |
| WO | WO-9944159 A1 | 9/1999 |
| WO | WO-9945726 A1 | 9/1999 |
| WO | WO-9950778 A1 | 10/1999 |
| WO | WO-0014987 A1 | 3/2000 |
| WO | WO-0036836 A1 | 6/2000 |
| WO | WO-0036886 A1 | 6/2000 |
| WO | WO-0043892 A1 | 7/2000 |
| WO | WO-0043899 A1 | 7/2000 |
| WO | WO-0077664 A2 | 12/2000 |
| WO | WO-0124027 A1 | 4/2001 |
| WO | WO-02065252 A2 | 8/2002 |
| WO | WO-02065318 A2 | 8/2002 |

OTHER PUBLICATIONS

"U.S. Appl. No. 09/409,305, Reply Brief filed Nov. 30, 2009", 5 pgs.
"U.S. Appl. No. 09/409,305, Advisory Action mailed Mar. 29, 2005", 2 pgs.
"U.S. Appl. No. 09/409,305, Advisory Action mailed Jul. 29, 2002", 2 pgs.
"U.S. Appl. No. 09/409,305, Advisory Action mailed Dec. 30, 2008", 3 pgs.
"U.S. Appl. No. 09/409,305, Appeal Brief filed Jun. 16, 2009", 24 pgs.
"U.S. Appl. No. 09/409,305, Appeal Brief mailed Mar. 8, 2005", 8 pgs.
"U.S. Appl. No. 09/409,305, Examiner Interview Summary mailed Jan. 25, 2005", 3 pgs.
"U.S. Appl. No. 09/409,305, Examiners Answer to Appeal Brief mailed May 31, 2005", 16 pgs.
"U.S. Appl. No. 09/409,305, Examiners Answer to Appeal Brief mailed Sep. 29, 2009", 8 pgs.
"U.S. Appl. No. 09/409,305, Final Office Action mailed Apr. 14, 2003", 11 pgs.
"U.S. Appl. No. 09/409,305, Final Office Action mailed May 8, 2002", 7 pgs.
"U.S. Appl. No. 09/409,305, Final Office Action mailed Sep. 8, 2004", 13 pgs.
"U.S. Appl. No. 09/409,305, Final Office Action mailed Oct. 31, 2008", 2 pgs.
"U.S. Appl. No. 09/409,305, Non Final Office Action mailed Jan. 16, 2002", 6 pgs.
"U.S. Appl. No. 09/409,305, Non Final Office Action mailed May 21, 2008", 7 pgs.
"U.S. Appl. No. 09/409,305, Non Final Office Action mailed Oct. 23, 2002", 9 pgs.
"U.S. Appl. No. 09/409,305, Non Final Office Action mailed Dec. 17, 2003", 11 pgs.
"U.S. Appl. No. 09/409,305, Non-Final Office Action mailed Jan. 25, 2008", 3 pgs.
"U.S. Appl. No. 09/409,305, Notice of Allowance mailed Jan. 10, 2011", 9 pgs.
"U.S. Appl. No. 09/409,305, Pre-Appeal Brief Request mailed Feb. 11, 2009", 4 pgs.
"U.S. Appl. No. 09/409,305, Preliminary Amendment filed Sep. 28, 2000", 27 pgs.
"U.S. Appl. No. 09/409,305, Reply Brief filed Aug. 1, 2005", 12 pgs.
"U.S. Appl. No. 09/409,305, Response filed Mar. 8, 2005 to Final Office Action mailed Sep. 8, 2004", 9 pgs.
"U.S. Appl. No. 09/409,305, Response filed Mar. 24, 2003 to Non Final Office Action mailed Oct. 23, 2002", 23 pgs.
"U.S. Appl. No. 09/409,305, Response filed Apr. 16, 2002 to Non Final Office Action mailed Jan. 16, 2002", 6 pgs.
"U.S. Appl. No. 09/409,305, Response filed Apr. 23, 2008 to Non-Final Office Action filed Jan. 25, 2008", 25 pgs.
"U.S. Appl. No. 09/409,305, Response filed May 17, 2004 to Non Final Office Action mailed Dec. 17, 2003", 9 pgs.
"U.S. Appl. No. 09/409,305, Response filed Jul. 8, 2002 to Final Office Action mailed May 8, 2002", 15 pgs.
"U.S. Appl. No. 09/409,305, Response filed Aug. 19, 2008 to Non Final Office Action mailed May 21, 2008", 13 pgs.
"U.S. Appl. No. 09/409,305, Response filed Sep. 10, 2003 to Final Office Action mailed Apr. 14, 2003", 32 pgs.
"U.S. Appl. No. 09/409,305, Response filed Dec. 8, 2004 to Final Office Action mailed Sep. 8, 2004", 14 pgs.
"U.S. Appl. No. 09/409,305, Response filed Dec. 20, 2008 to Final Office Action mailed Oct. 31, 2008", 12 pgs.
"U.S. Appl. No. 09/409,305, Second Preliminary Amendment filed Aug. 28, 2001", 1 pg.
"U.S. Appl. No. 13/041,133, Non Final Office Action mailed Aug. 31, 2012", 7 pgs.
"U.S. Appl. No. 13/041,133, Notice of Allowance mailed May 8, 2013", 9 pgs.
"U.S. Appl. No. 13/041,133, Notice of Allowance mailed Aug. 19, 2013", 9 pgs.
"U.S. Appl. No. 13/041,133, Response filed Nov. 29, 2012 to Non Final Office Action mailed Aug. 31, 2012", 8 pgs.
"U.S. Appl. No. 13/041,133, Supplemental Amendment and Response after Notice of Allowance filed Jul. 24, 2013", 8 pgs.
"English Application Serial No. 0022707.4, Search Report mailed Feb. 2, 2004", 3 pgs.
"Enhanced Content Specification", ATVEF, retrieved on Mar. 28, 2000, [Online]. Retrieved from the Internet: <URL: www.atvef.com/library/spec1-la.html>, (1998), 38 pgs.
"European Application Serial No. 00308415.9, Appeal Against Decision to Refuse filed Apr. 1, 2010", 2 pgs.
"European Application Serial No. 00308415.9, Decision to Refuse mailed Jan. 22, 2010", 4 pgs.
"European Application Serial No. 00308415.9, Grounds of Appeal filed May 31, 2010", 17 pgs.
"European Application Serial No. 00308415.9, Office Action mailed Aug. 9, 2005", 3 pgs.
"European Application Serial No. 00308415.9, Office Action mailed Aug. 16, 2004", 5 pgs.
"European Application Serial No. 00308415.9, Office Action mailed Sep. 26, 2006", 3 pgs.
"European Application Serial No. 00308415.9, Office Action mailed Dec. 13, 2007", 3 pgs.
"European Application Serial No. 00308415.9, Response filed Feb. 20, 2006 to Office Action mailed Aug. 9, 2005", 13 pgs.
"European Application Serial No. 00308415.9, Response filed Feb. 28, 2005 to Office Action mailed Aug. 16, 2004", 6 pgs.
"European Application Serial No. 00308415.9, Response filed Apr. 10, 2007 to Office Action mailed Sep. 26, 2006", 33 pgs.
"European Application Serial No. 00308415.9, Response filed Jun. 23, 2008 to Office Action mailed Dec. 13, 2007", 19 pgs.
"European Application Serial No. 00308415.9, Search Report mailed Dec. 14, 2000", 3 pgs.

(56) References Cited

OTHER PUBLICATIONS

"European Application Serial No. 00308415.9, Summons to Attend Oral Proceedings mailed Apr. 22, 2009", 3 pgs.
"European Application Serial No. 00308630.3, Decision to Refuse mailed Jan. 29, 2010", 4 pgs.
"European Application Serial No. 00308630.3, Office Action mailed Apr. 28, 2008", 2 pgs.
"European Application Serial No. 00308630.3, Office Action mailed Aug. 9, 2005", 3 pgs.
"European Application Serial No. 00308630.3, Office Action mailed Aug. 16, 2004", 5 pgs.
"European Application Serial No. 00308630.3, Office Action mailed Sep. 26, 2006", 3 pgs.
"European Application Serial No. 00308630.3, Office Action mailed Dec. 13, 2007", 3 pgs.
"European Application Serial No. 00308630.3, Response filed Feb. 20, 2006 to Office Action mailed Aug. 9, 2005", 11 pgs.
"European Application Serial No. 00308630.3, Response filed Feb. 28, 2005 to Office Action mailed Aug. 16, 2004", 8 pgs.
"European Application Serial No. 00308630.3, Response filed Apr. 10, 2007 to Office Action mailed Sep. 26, 2006", 52 pgs.
"European Application Serial No. 00308630.3, Response filed Jun. 23, 2008 to Office Action mailed Dec. 13, 2007", 27 pgs.
"European Application Serial No. 00308630.3, Search Report mailed Dec. 13, 2000", 3 pgs.
"European Application Serial No. 00308630.3, Summons to Attend Oral Proceedings mailed Apr. 22, 2009", 3 pgs.
"Frequently Asked Questions", The Intercast Industry Group, (Fall 1996), 1-7.
"Funkschau Fachzeitschrift fur elektronische Kommunikation", vol. 6/96 of Jan. 3, 1996,, 70-75.
"ICTV Brochure", ICTV, (1988), 26 pags.
"Interactive Television Broadcast Using Character Broadcast System, Video Information and Broadcast Technology", Television Society, vol. 11, (Nov. 20, 1995), 1482-1487.
"Intercast Using Gap Television Signal", Nikkei BP Corp, Nikkie Electronics, Japan, No. 651, (Dec 18, 1995), 106.
"International Application Serial No. PCT/US00/26888, International Preliminary Examination Report mailed".
"International Application Serial No. PCT/US00/26888, International Search Report mailed Jan. 31, 2001", 2 pgs.
"Leaders in PC, Broadcast and Cable Industries Announce Formation of Industry Group to Promote New Digital Medium for the Home PC", Intercast Industry Group, Press Release, Business Wire, (Oct. 23, 1995).
"Mexican Application Serial No. PA/a/2001/012462, Amendment filed Mar. 12, 2008", with English translation of claims, 52 pgs.
"Mexican Application Serial No. PA/a/2001/012462, Notice of Allowance mailed Apr. 22, 2008", 2 pgs.
"TV Navigator", brochure; copyright 1997 by Network Computer, Inc., (1997), 6 pgs.
"Worldgate brochure", copyright 1998 by Worldgate Communications, (1988), 12 pgs.

Beaudin, Sandra, "The Web Is Not TV, or Is It?", [Online]. Retrieved from the Internet: <URL:www.lcc.gatech.edu/gallery/dzine/webtv>, (Accessed Oct. 9, 2003), 4 pgs.
Buckler, Grant, "Different Takes on Wedding TV to Web", Newsbytes, [Online]. Retrieved from the Internet: <URL:www.exn.ca/Stories/1999/03/01/04.asp>, (Mar. 1, 1999), 2 pgs.
Cline, et al., "DirectShow RTP Support for Adaptivity in Networked Multimedia Applications", Multimedia Computing and Systems, 1998, Proceedings, IEEE International Conference, (Jun. 28-Jul. 1, 1998), 13-22.
Cripps, Dale, "Gates, TV, Interactivity", [Online]. Retrieved from the Internet: <URL: http://web-starcom/hdtvnews/gatestvinteractivity.html>, (May 5, 1998), 1-4.
Cripps, Dale, "Internet TV Advertising", [Online]. Retrieved from the Internet: <URL: http://web-star.com/hdtvnews/internettvadvertising.html>, (May 8, 1998), 1-3.
Cripps, Dale, "Web TV over Digital Cable", [Online]. Retrieved from the Internet: <URL: http://web-star.com/hdtvnews/webtvoverdigitalcable.html>, (May 4, 1998), 1-4.
Dybvik, Per Einar, et al., "Combining WWW/Mosaic with Realtime Multimedia Conferencing in Distance Education", The Second International WWW Conference '94, Mosaic and the Web, Advance Proceedings, vol. 1,, (Oct. 17-20, 1994), 423.
Eitz, "Combiners for Videotext Signals", Broadcast Technology Reports, translation of vol. 28(6), XP002182048, Nordestedt, Germany, (Nov. 1984), 273-289.
Gillich, S., et al., "ATVEF Integration with DVB Using IP/MPE", retrieved on Jun. 8, 2001, [Online]. Retrieved from the Internet: <URL: www.atvef.com/library/atvef-dub-bindingR8.html>, (Dec. 20, 1999), 5 pages.
Kumar, Vinay, et al., "A Shared Web to Support Design Teams", Third Workshop on Enabling Technologies: Infrastructure for Collaborative Enterprises, Morgantown, West Virginia, (Apr. 17-19, 1994), 178.
Le Hegaret, Philippe, "Document Object Module (DOM)", Retrieved on Jun. 22, 2001, [Online]. Retrieved from the Internet: <URL: www.w3.org/DOM/>, (Accessed Jun. 22, 2001), 2 pgs.
Mannos, T.J., "Re: Web page prefetching?", Retrieved on Oct. 4, 2002, DEJA News, [Online]. Retrieved from the Internet: <URL: http://dejanews.com>, (Dec. 1, 1997), 1 pg.
Murphy, Kieron, "HyperTV fuses JAVA with television", [Online]. Retrieved from the Internet<URL:www.javaworld.com/javaworld/jw-05-1996/jw-05-hypertv.html>, (Accessed Oct. 9, 2003), 3 pgs.
Steinhorn, J., et al., "Embedded Systems Programming-Enhancing TV with ATVEF", retrieved on Mar. 28, 2000, [Online]. Retrieved from the Internet: <URL: www.embedded.com/1999/9910/9910ial.htm>, (Accessed Mar. 28, 2000), 10 pages.
Wittig, Hartmut, et al., "Intelligent Media Agents in Interactive Television Systems", Proceedings of the International Conference on Multimedia Computing and Systems, (May 15, 1995), 182-189.
Woo, Tak K., et al., "A Synchronous Collaboration Tool for the World-Wide Web", Second International WWW Conference '94, Mosaic and the Web, Advance Proceedings, vol. 1, (Oct. 17-20, 1994), 315.
Yu, Phillip S., et al., "Design and analysis of a look-ahead scheduling scheme to support pause-resume for video-on-demand applications", Multimedia Systems, vol. 3, (1995), 137-149.

SOFTWARE DESIGN

ENHANCED VIDEO PROGRAMMING SYSTEM AND METHOD UTILIZING USER-PROFILE INFORMATION

REFERENCE TO RELATED APPLICATIONS

This application is a continuation of U.S. patent application Ser. No. 13/041,133, now U.S. Pat. No. 8,621,541, filed on Mar. 4, 2011, which is a Continuation of U.S. patent application Ser. No. 09/409,305, now U.S. Pat. No. 7,949,722, filed on Sep. 29, 1999. Each of these applications is incorporated herein by reference in its entirety.

The following United States patents are incorporated herein by reference in their entirety: U.S. Pat. No. 6,513,069, entitled "ENHANCED VIDEO PROGRAMMING SYSTEM AND METHOD FOR PROVIDING A DISTRIBUTED COMMUNITY NETWORK"; and U.S. Pat. No. 7,120,871, entitled "ENHANCED VIDEO PROGRAMMING SYSTEM AND METHOD UTILIZING A WEB PAGE STAGING AREA."

BACKGROUND OF THE INVENTION

Today, the capabilities of computers to provide massive amounts of educational and entertainment information has exploded with the Internet. The Internet has the power to transform society through unprecedented levels of information flow between members. Currently, on-line systems offer a variety of different services to users, including news feeds, electronic databases (either searchable by the user directly on the on-line system, or downloadable to the user's own computer), private message services, electronic newsletters, real time games for play by several users at the same time, and job placement services, to name a few. However, today, most on-line communications occur merely through text. This currently stands in great contrast to the audio/visual presentation of the alternative electronic medium, television. However, it is expected that as multimedia's incessant growth continues, audio/visual programs will proliferate and text will become less and less dominant in the on-line environment. Even though these programs will be introduced, the Internet, will remain essentially user unfriendly due to its very massiveness, organization, and randomness. Simply stated, there is no order or direction in the Internet. Specific pieces of information are many times hard to find, and harder yet, is the ability to put that piece of information into a meaningful context.

Television, on the other hand, has been criticized for being a passive medium—"chewing gum for the eyes," as Fred Allen once observed. Television has always been something you watched, not something you do. Many social critics believe that the passivity television depends on has seeped into our entire culture, turning a nation of citizens into a nation of viewers. While interactive television systems have increased the level of user interaction, and thus, provided greater learning and entertainment opportunities, vast information resources such as databases are inaccessible from such a medium.

What is needed is a means to close the gap between video programming and the information superhighway of the Internet. What is needed is a wider, richer experience integrating audio/visual and textual database elements into an organized unique interactive, educational, entertainment experience. Currently, the Internet is a repository of information on virtually any subject. However, what is needed is a mechanism for combining the user-friendly visual experience of television with the vast information resources of the Internet. What is further needed is a system and method for distributing content with that mechanism combining television programming with Internet resources.

SUMMARY OF THE INVENTION

Systems consistent with the present invention combine broadcast television programming and/or video programming which appears on a VHS or Beta tape, CD-ROM, DVD or other medium, or particular content from the Internet, or video programming at a video server (hereinafter "video programming") with the massive Internet, creating a new and powerful educational and entertainment medium. The system allows consumers to receive more information in a more efficient manner than either television or the Internet alone. Consumers not only can see a news report on television, but they can also read pertinent information about the report, as well as explore related information about the story. The program becomes the introduction to a particular subject, rather than the entire subject itself. The act of viewing a program has now become a more engaging, enriching experience.

The system can also create a more intimate relationship between the viewer and the program. The user might be solving problems or performing virtual experiments on the Internet site that a teacher is discussing in an educational television program. Similarly, the consumer might be solving problems that the fictional characters in a television program must solve. In both cases, the consumer is an active participant in the process, rather than a passive observer.

Instead of an undirected and unfocused exploration of Internet sites, by synching specific Internet pages to the video signal, the system puts the Internet in context. The television program producers now can decide what additional information to offer their audience. This material can now be seen in the context of the television program.

An additional advantage is that consumers don't have to search through the literally hundreds of millions of pages on the Internet to find appropriate material. The material has already been filtered by the program producers and delivered to the consumer automatically.

Another advantage of the system is that it changes the nature of advertising. Since additional information can be given to consumers automatically, advertising can now be more substantive, allowing customers to make more informed choices. Now, the act of purchasing a product seen on television can be streamlined—the consumer can be given the choice of buying the product instantly using the two-way capabilities of the system.

In addition, users can take advantage of the two-way capabilities of the Internet to respond to polls, to send e-mail or to link to additional sites. For example, a viewer watching a television news program, through the system of the invention, can receive a stream of Web pages which provide additional, specific information relating to the news content—whether background on the Presidential primaries or the latest change in interest rates.

The video programming and corresponding Internet pages can be viewed on personal computers equipped with a television card, but the open software-based approach enables anyone with a television set and JAVA enabled PC to experience the system of the invention.

By marrying the appeal of video with the two-way data transfer capabilities of the Internet, the system creates a powerful new medium: Video producers and Internet site creators can enhance their content to extend their brand identity and differentiate their program offerings to the millions of people who are spending more time navigating through the resources of the World Wide Web rather than watching television; advertisers can speak more directly to consumers by directly sending Web pages to the consumer instead of only displaying Web addresses in their commercials; and consumers can gain a new level of interest and interactivity over a video-based medium. In addition to providing significant and immediate benefits to broadcasters and advertisers, the system will also present educational programmers with a way to more effectively use Internet resources in the classroom.

Recently, several media companies have joined to create a system for linking the Internet and television on the personal computer, called "Intercast." In this system, content will be provided simultaneously with the TV video signal. This system, however, requires that stripped down Web pages be sent in the vertical blanking interval (VBI) of the video signal, using up to three scan lines limiting effective bandwidth to approximately 28.8 kbps. This approach, however, requires specialized hardware to both insert the Web pages into the VBI and extract these codes at each PC since it takes up to three scan lines of the VBI. Thus, the complexity and cost of the PC is increased. Because the Web pages are transmitted with the video signal, the Intercast system is not a true "two-way" system, but merely a one-way "piggyback" system. In addition, the Intercast is an analog video product, and thus, cannot handle digital video data.

Systems consistent with the present invention, on the other hand, are much more flexible, but less complex, systems. The systems support either analog or digital television broadcasts without broadcasters or end-users having to alter their existing systems, thus enabling broadcasters to reach a wide audience within a short time.

In one embodiment, the actual Web pages are not forced into the very limited bandwidth of the vertical blanking interval (VBI). Instead, merely eight fields of line 21 of the VBI are used to deliver the relevant Internet Web page addresses to the PC. These addresses are called "uniform resource locators" (URLs). The system then directs the particular Web browser to retrieve the identified Web pages from the Internet. Upon receipt of the particular Web page(s), the system syncs the Web page(s) to the video signal, and at the appropriate times, presents the Web pages on one portion of the computer screen with the television video signal, shown in a window on another portion of the screen, and thus, provides the synergistic Internet and television experience. One of the advantages of the system of the present invention is that no specialized chip set need be produced and implemented into the standard PC. Thus, complexity is kept to a minimum.

In another embodiment of the present invention, the VBI is not used to transmit the URLs to the user. In this alternative embodiment, member broadcasters enter the Internet through a member account, and will be provided with a graphical user interface for pre-scheduling Internet addresses, or URLs, for transmission to users at particular times of day. This interface could also be used to transmit real time live transmissions of URLs to users at the same time as a broadcast. The URLs are stored in a "Link File" for later transmission over the Internet to the user at the broadcasters entered time, which corresponds to the broadcast time of an associated program. The timing of URLs could be determined in advance or can be sent out live. This embodiment eliminates the need to place the URLs in the VBI, and also allows the broadcaster to store more than one Link File for transmission to users in different time zones, for example. Further, more than one broadcaster could access the same master schedule if desired, and add or delete certain URLs to personalize the program for their local audiences. Also, personalization can be taken to the single user, or small group of users, by having the system send a different stream of URLs to each user, depending on a unique user profile, for example. Thus, the personalization feature of this embodiment allows each user to receive information uniquely relevant to their interests, demographics, history, etc. This embodiment makes the transmission of URLs to the user even less complex than other embodiments disclosed herein.

Another embodiment permits dynamic reconfiguration of a network for transmitting content, such as that located using the URLs. The network referred to as a distributed community network, includes hubs that may logically reside on any machine and provide control of routing packets containing the content. By using hubs to assist in routing of packets, the burden of routing control at a corresponding server is decreased, enhancing the reliability and efficiency of the network in transmitting content and permitting access to content.

Thus, embodiments consistent with the present invention provide order and direction to the Internet by using television signals to place, orient and control such information in a meaningful context. They also create a more intimate relationship between the viewer and the program by enriching the learning experience through the provision of more in-depth information.

An article of manufacture consistent with the present invention is used for compiling and maintaining information for use in routing and transmitting content to a machine via a network. It includes a computer-readable medium includes fields for specifying an identification of the machine, an address of the machine, and user-profile information for use in determining a type of content to transmit to the machine. The user-profile information is specified in an hierarchical structure.

A method consistent with the present invention includes compiling and maintaining information for use in routing and transmitting content to a machine via a network by specifying particular fields within a computer-readable medium. The method includes receiving information for use in generating a user profile and specifying in the medium, using the information, an identification of a machine, an address of the machine, and user-profile information for use in determining a type of content to transmit to the machine. The user-profile information is stored in an hierarchical attribute value pair data structure.

DETAILED DESCRIPTION

Video Programming System and Method

Figure 1:
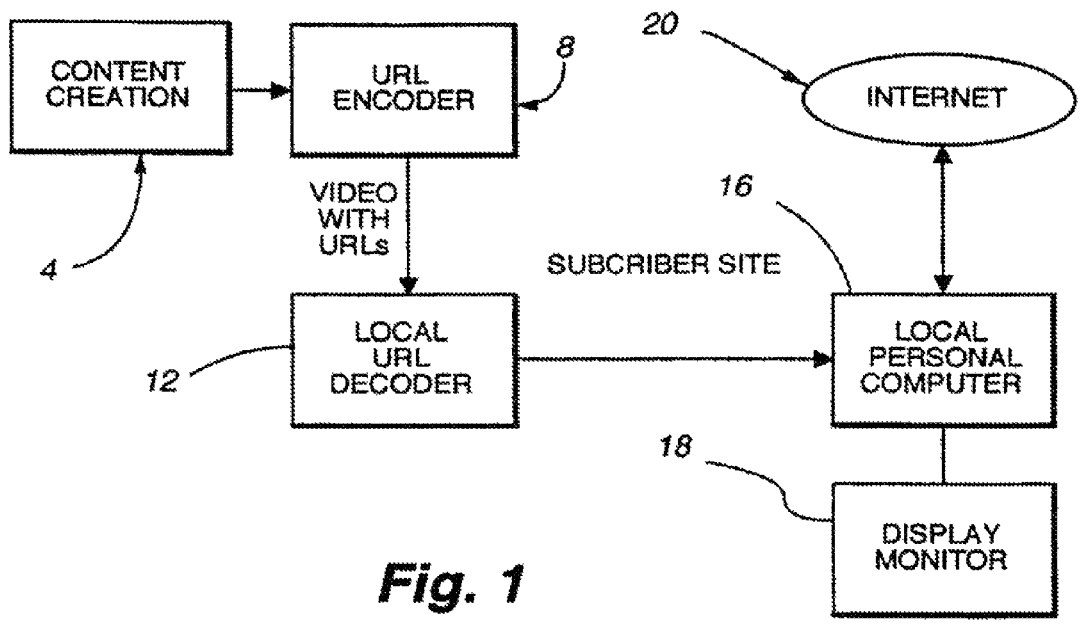
FIG. 1 is a diagram of the system design, showing the receipt and decoding of video signals at the subscriber location using the method of the present invention.

One system consistent with the present invention combines the rich visual capabilities of video with the vast resources of the Internet. As shown in FIG. 1, an embodiment of the invention is a computer based system for receiving a video program along with embedded uniform resource locators (URLs)—which direct the user's computer 16 to address locations, or Web sites, on the Internet to retrieve related Web pages. These Web pages correspond to the 20 video presentation. The particular video programming can be delivered in analog, digital or digitally compressed formats (e.g., MPEG2) via any transmission means, including satellite, cable, wire, television broadcast or sent via the Web.

The video programming is preferably created at a centralized location, i.e., content creation 4 as shown in FIG. 1, for distribution to subscribers in their homes, for example. Program creation is accomplished according to any conventional means known in the art. After a video program is created, uniform resource locators are embedded, in one embodiment, into the vertical blank interval of the video programming by the URL encoder 8, shown in FIG. 1. In this embodiment, the URLs are encoded onto eight fields of line 21 of the VBI. Line 21 is the line associated with close captioning, among other things. However, the URLs could also be embedded in other fields of the VBI, in the horizontal portion of the video, as part of the audio channel, in any subcarrier to the video, or if digital, in one of the data fields.

Although FIG. 1 shows the video with URLs over the same transmission line, the URLs can be sent down independently of the video program on a data channel. In this embodiment, the URLs can be forwarded to the remote sites either prior to initiation or during the program. Preferably, the URLs have associated time stamps which indicate to the subscriber stations when, during the video program, to display the particular Web pages addressed by the URLs. Alternatively, the user can select when to call the particular Web pages for display with the video program.

The particular information in line 21 is not part of the visual part of the program, and thus, is not perceptible to the human eye, thereby making it ideal to send data information to the users. While the bandwidth capacity of line 21 is limited, because the system transmits only the uniform resource locators (URLs), and not full Web pages, there is more than enough capacity. Furthermore, no additional hardware is necessary at the PC 16 to implement the elements of the present invention. Thus, the present invention has the additional advantages of being very efficient and takes advantage of conventional hardware.

Once the video program is created, it can be transmitted to user sites over any transmission means, including broadcast, cable, satellite, or Internet, and may reside on video servers. Furthermore, the video program, with or without embedded URLs, can be encoded on a VHS or Beta tape, DVD or other medium.

Preferably, each receiver station comprises any Intel x86 machine (preferably a 486 processor, pentium processor, etc.), an Apple Computer, UNIX or any other type of standard computer workstation. The local PC 16 is preferably connected to either a cable and/or broadcast television connection or to a local VCR or other video source. At each subscriber site, the local personal computer 16 preferably receives the cable transmission by cable connection on the back of the personal computer 16. The video/audio program can then be processed for display on the computer screen using any conventional PC card capable of displaying NTSC signals on a computer monitor, such as a WinTV card. In addition to the cable connection, however, in the present invention there is also an Internet 20 connection created concurrently with the cable connection.

The Internet 20 connection can be via high-speed line, RF, conventional modem or by way of two-way cable carrying the video programming. The local PC 16 has Internet access via any of the current ASCII software mechanisms. In one embodiment, at each subscriber home, an associated local URL decoder 12 receives the cable video television program, as shown in FIG. 1. The local URL decoder 12 extracts the URLs, preferably embedded in the vertical blanking interval, with the use of any conventional VBI decoder device. The URL decoder 12 may be either a stand-alone unit or a card which is implemented into the personal computer 16.

Figure 2:
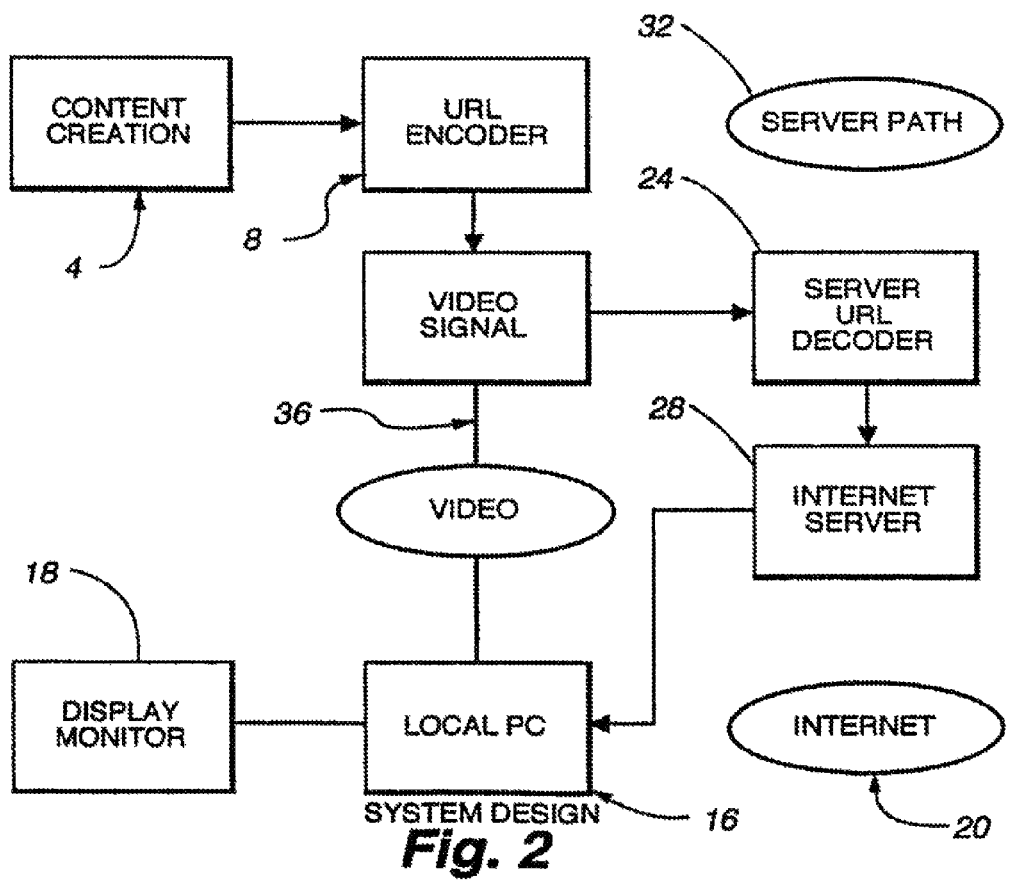
FIG. 2 is a diagram showing an alternative system embodiment to achieve the integration of the Internet information with the video content by decoding the uniform resource locators at a server site and then transmitting the URLs to the subscriber stations via the Internet.

In another embodiment shown in FIG. 2, the uniform resource locators (URLs) are encoded into the video in the same manner as described above. Again, the URLs are preferably encoded onto eight fields of line 21 of the VBI, but may also be sent independently of the video. In this embodiment, the URL decoder 24 is located at the server site, as opposed to the subscriber location. When the decoder 24 receives the video program signal, it strips out the URL codes on line 21 of the VBI and delivers these codes independently to an Internet server 28. The URL code is then subsequently delivered over the Internet 20 to the user PC 16. Simultaneously, the video is broadcast over conventional broadcast or cable transmission means 36 to the user's personal computer 16.

Figure 4:
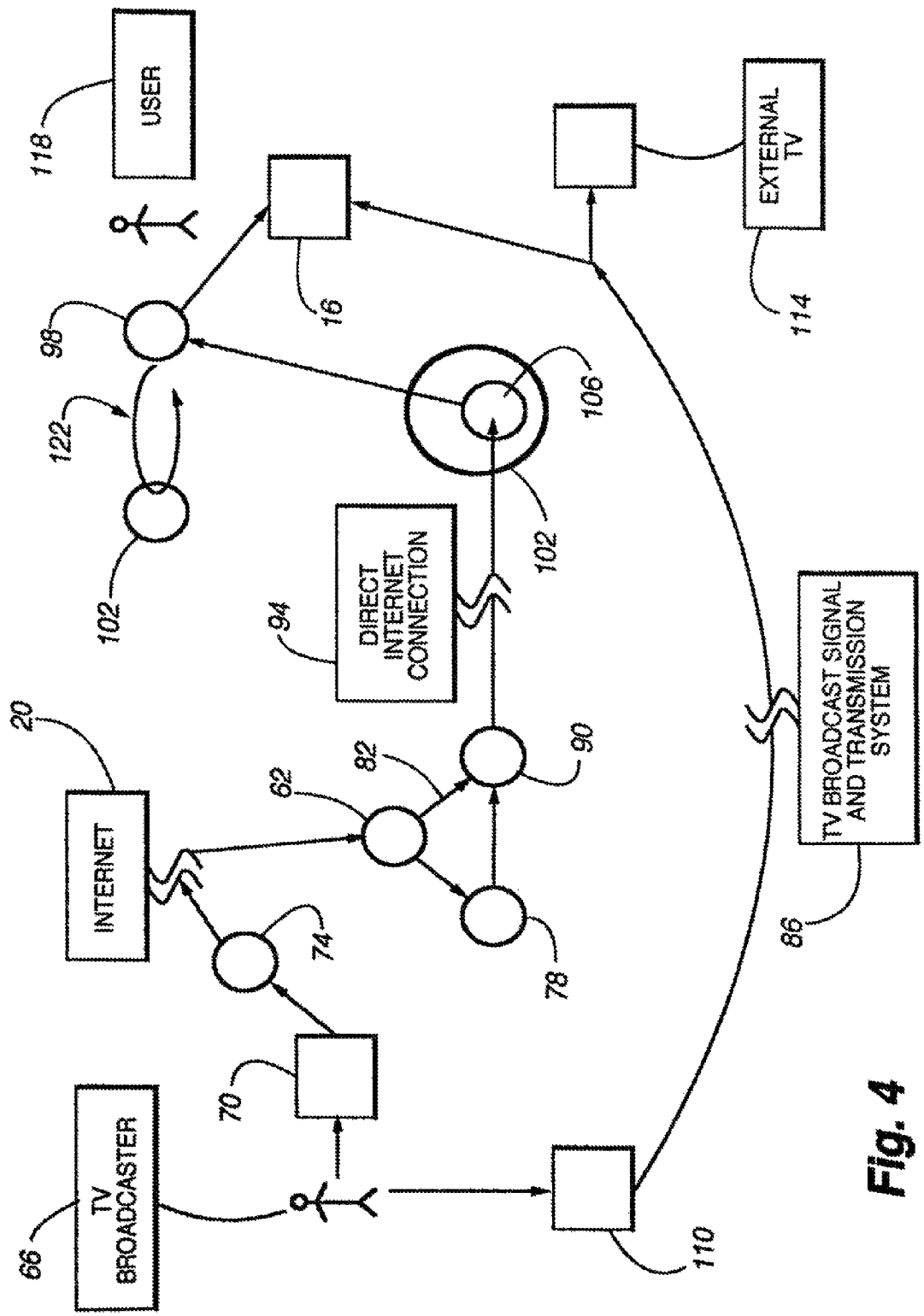
FIG. 4 is a diagram showing another preferred system embodiment to achieve the direct transmission of URLs over the Internet to the user at a broadcaster's entered time without encoding the URLs into the VBI.

Another embodiment of the system, shown in FIG. 4, does not depend on, or even use, the VBI. In this embodiment, the system will run an online service over the Internet 20. This service will be in the form of an Internet Web site 62 that provides a user-interface to a database 78 and to one or more associated data servers 90. The service will provide member-accounts to TV broadcasters 66 who sign up to use the system of the invention in conjunction with their broadcasts. Each member broadcaster will enter the service at their computer 70 through Web browser software 74 using their member account by entering various identification and password information. Once within their account, the member will be provided with a graphical user interface for pre-scheduling URLs for transmission to users 118 over a direct Internet connection 94 at particular times of day. The same user interface, or a variation on it, can be used by broadcasters for live transmission 82 of URLs to users at the same time as a broadcast 86.

For example, one example of this interface might be a scheduling calendar (daily, weekly, monthly, yearly) in which the broadcaster 66 may allocate time periods which coincide with their broadcasts 86, and during which they will send out URLs to their users to link to Web pages. For each time period (for example, a particular hour long period during the day) determined by the broadcaster 66 to be a broadcast period (a period during which they want to transmit URLs that correspond to a television show being broadcast from their TV broadcast facility 110 to the external TV 114 of the user 118 at that time), the broadcaster 66 may then enter a series of URLs into an associated file ("Link File") for transmission over the Internet 20 at that time. This Link File might have a user interface such as a spreadsheet, table, or list, or it could be simply a tab-delimited or paragraph-delimited text-file. As an example, each of the records in the Link File consists of a data structure which could contain information such as:

(<timecode>, <URL>, <label or title>, <additional information>, <additional information>, . . . )

The above data structure is just one example. The records in the Link File preferably specify the time, Internet address (i.e. URL), label (such as an associated name), and some optional additional information, for each Web page the broadcaster 66 desires to launch during a show.

When a broadcaster 66 modifies their calendar and/or the Link File associated with any given time period(s) in their calendar, this information is saved into the database 78 that is attached to the site 62. Each broadcaster 66 may maintain multiple calendars in the database 78 if they broadcast in different time zones, for example.

The database 78 provides the Link File records for upcoming time periods to a server 90, which may be one server or a distributed network of server programs on multiple computers across the network, to be utilized for scaling to large national or global audiences. The server 90 provides the Link File records, including the URLs, to the user's personal computer 16, which is connected via a network. Examples of possible networks include the public Internet 94, a direct private network, or even a wireless network.

One feature of the above embodiment is that one or more broadcasters 66 may utilize the same schedule in the database 78 for their own broadcasts 86 or during the same broadcast. For example, a network broadcaster may develop a master schedule and various affiliate broadcasters may subscribe to that schedule or copy it (in the database) and add or delete specific URLs in the schedule for their local audiences or unique programming. This scheme enables affiliates to insert URLs for local advertisers or local subjects into a sequence of more general URLs provided by their network broadcaster 66. In other words, the affiliate can add links that ride on the network feed and then redistribute it to their local audiences.

This embodiment can also enable personalization in the form of unique series of URLs specific to each user's unique profile, which is directly sent over the Internet 20 to each user's specific client software 106. This can be achieved from the broadcaster 66 to each individual user 118, or to particular collections of users. To accomplish personalization, the service may send a different stream of URLs to each user's client software program 106. The stream of URLs sent would depend on a user profile stored in the database 78 or the client software program 106, a user profile which is built on demand or over time for each user 118 based on criteria such as the location of the user, choices the user makes while using a client software program 106, or choices the broadcaster 66 makes during a broadcast 86, or automatic choices made by an algorithm (such as a filter) residing on the service 62. Personalization enables each user to receive URLs which are uniquely relevant to their interests, demographics, history, or behavior in the system.

System Operation

Once the URLs have reached the personal computer 16, system operation is similar for all of the embodiments diagramed in FIGS. 1, 2, and 4.

Figure 3:
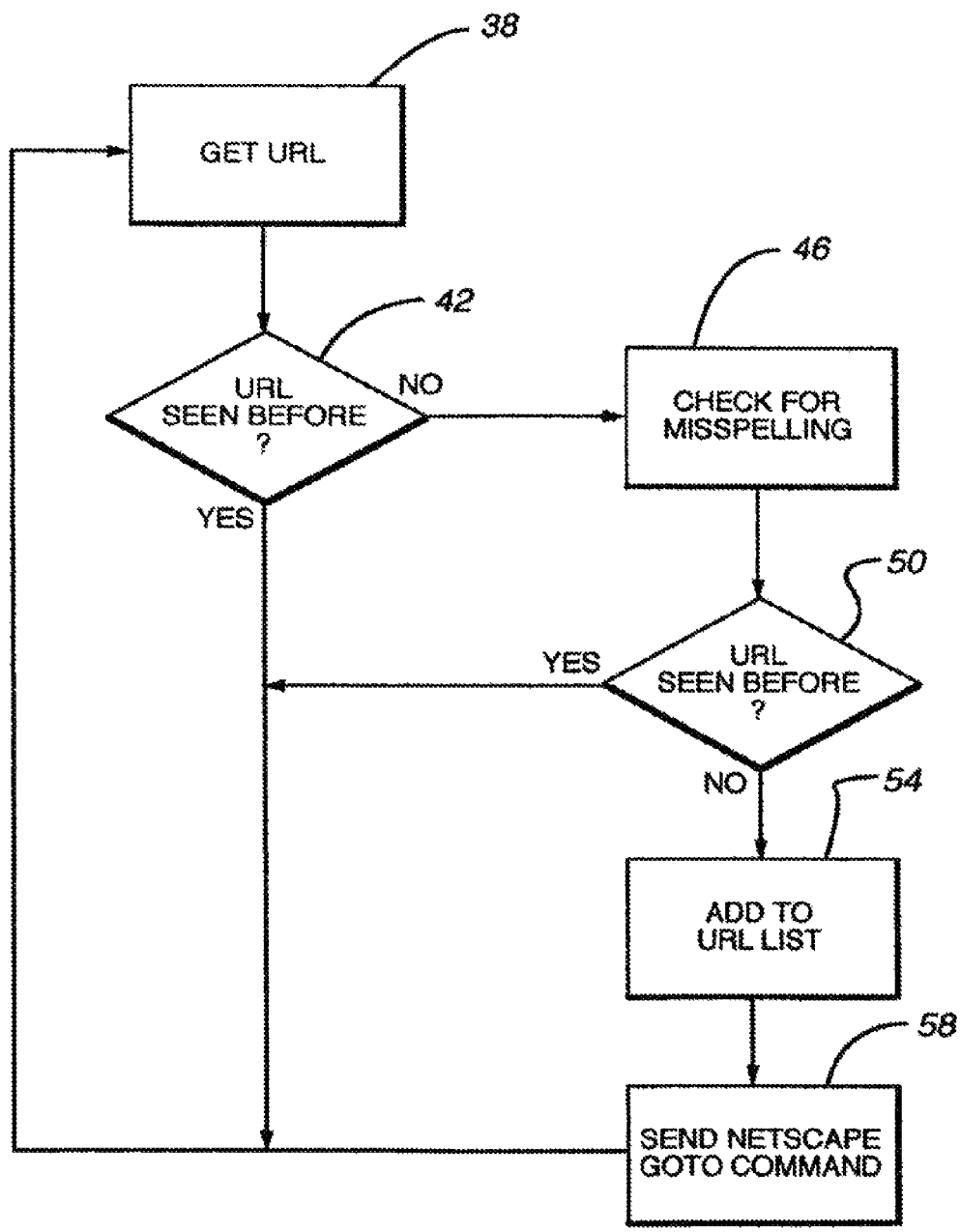
FIG. 3 is a flow diagram of the basic software design of the present invention.

In one embodiment, a JAVA enabled browser 98 as well as specialized software 106 for performing part of the method of the present invention are installed on the computer 16. The JAVA enabled browser 98 allows the computer 16 to retrieve the Web pages 102 and is preferred software, since it is platform independent, and thus, enables efficient and flexible transfer of programs, images, etc., over the Internet 20. The specialized interface software 106 (hereinafter, "client software"), attached as Appendix A, acts as an interface between the video programming and the Internet functions of the present invention. The client software 106 retrieves URLs from the video program (embodiment of FIG. 1) or directly from the Internet connection (embodiments of FIGS. 2 and 4), interprets these URLs and directs the JAVA enabled browser 98 to retrieve the particular relevant Web pages 102, and synchronizes the retrieved Web pages to the video content for display on the user's computer 16, as shown in FIGS. 3 and 4 and explained in more detail below.

In one method, the URLs are encoded and embedded into the video signal by inserting them into the vertical blanking interval (VBI), as mentioned above.

In another embodiment, the URLs are entered by member TV broadcasters 66 along with specified times for transmitting the URLs to the user. At the appropriate times, the URLs are sent directly over the Internet to the user's PC 16 via the client software 106 over a direct point-to-point or multicasting connection.

One method of the present invention has the capability to detect identical URLs sent directly after one another which causes the browser not to fetch URLs in these particular cases. As shown in FIG. 3, once the URL code is received at the computer, the client software 106 first interprets the URL and determines in step 42 whether the particular URL has been received previously. If it has already been received, the next received URL is interpreted for determination of prior receipt. If the particular URL has not been detected before, the software checks for misspelling in step 46 and any other errors, and if errors exist, corrects these particular errors. Once again, it is determined whether the URL has been previously detected. If it has, the next URL is accessed in step 38. If the URL has not been detected, the specific URL is added to the URL list in step 54. The specific URL is then sent to the Web browser, preferably a JAVA enabled browser 98. Upon receipt of the URL, the browser 98, in step 58, will access the Web site address 122 (FIG. 4) indicated by the URL and retrieve the cited Web page(s) 102 via the Internet.

Viewers can view the integrated presentation in the following manner. As mentioned above, the video signal is processed and displayed on a video window on the PC screen using a WinTV card, for example. The corresponding audio is forwarded to the audio card and sent to the PC speakers.

The actual retrieved Web pages 102, referenced by the URL, are optionally time stamped to be displayed on the computer screen when predetermined related video content is displayed in the video window, thus, enlightening and enhancing the video presentation by providing in-depth information related to the video content thereto. Another section on the screen is also preferably used to represent an operational control panel. This control panel provides a list of the URLs that have been broadcast and correspondingly received by the computer 16. This control panel is updated to add a URL code each time a new URL code is received by the PC 16. This list gives the subscriber the flexibility to go back and retrieve particularly informative or interesting Web pages that have already been displayed earlier in the program, or alternatively, to print them out for future reference. Furthermore, the list could include URLs referring to Web pages not displayed with the broadcast program, but that provide further information on a certain topic of interest to the viewer.

An exemplary implementation of the present invention can best be understood with reference to an example. A viewer can begin watching a musical video featuring a new band, for example. As the video is received by the PC 16, URLs are either being received with the video signal or are being received directly via the Internet 20 or another data channel, and are being interpreted by the client software 106. Upon direction and command, the JAVA enabled browser 98 retrieves particular Web pages 102 from Internet 20 Web sites identified in the URLs. These Web pages 102 will then be displayed on the video screen at particular times. Thus, for example, while the viewer is watching the music video, biographical information on the band can also be displayed adjacently to the video window. Web pages 102 could also include an upcoming concert schedule, or even audio clips of the band's music may be downloaded from the Internet 20. As another example, a user could be watching a program relating to financial news. While the narrator is shown discussing high tech stocks, Web pages corresponding to detailed financial performance information on high tech stocks, environment and characteristics can be displayed with the video on the computer screen. If the personalization features are included, Web pages associated with a particular user's stock can be fetched and displayed on the computer screen with the video program. When the program narrator switches to a discussion on the weekly performance of the Dow Jones, Web pages presenting related financial performance information can be simultaneously displayed. Thus, it is evident that the present invention profoundly enriches the viewing and learning experience.

It is understood that there can exist alternative embodiments for use with the present invention. For example, the user can view the interactive program using a television set 114 or other display monitor in conjunction with the display screen of the personal computer 16. In this embodiment, the relevant Web pages are shown on the personal computer 16 while the video program is displayed on the television monitor 114. In this alternative embodiment, a cable set top box receives the television program from the multichannel cable. The personal computer 16 also receives the video program from the multi-channel cable and extracts the URLs, embedded in the vertical blanking interval of the video signal or directly transmitted 94 over the Internet 20. The client software 106 extracts the URLs and retrieves the particular Web pages as described above. The Web pages are then synchronized with the particular video frames and presented to the user. It is understood that a hyperlink may exist on the Web site that will allow the user to automatically load the client software and call up the specific television channel referenced in the Web site. For example, someone browsing the Internet 20 may come upon a major television network's Web site. They scroll to an interesting story then click on an hyperlink to turn on the software which tunes the TV window to the network to enhance the information residing at the Web site.

Furthermore, instead of receiving the video program from a transmission means, the video program can be addressed directly from the user site if the video program, with or without embedded URLs, is stored on a VHS, Beta, DVD or other medium. In this embodiment, the user PC 16 and/or television 114 are connected to a VCR, DVD player or other appropriate device.

Figure 5:
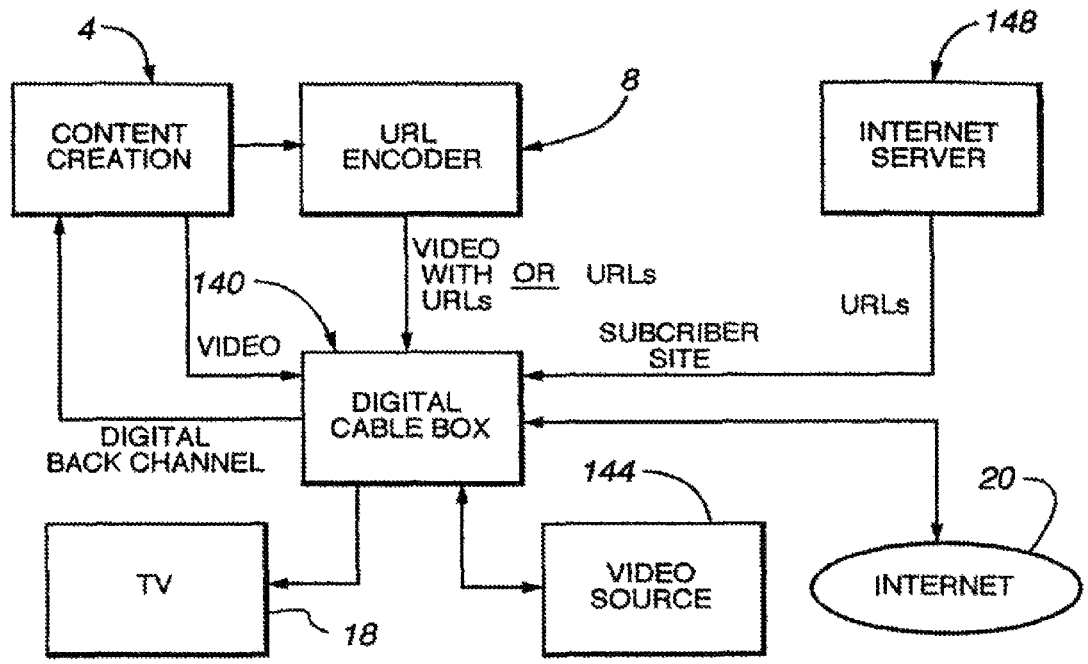
FIG. 5 is a diagram of another preferred embodiment including a digital cable box.
Figure 6:
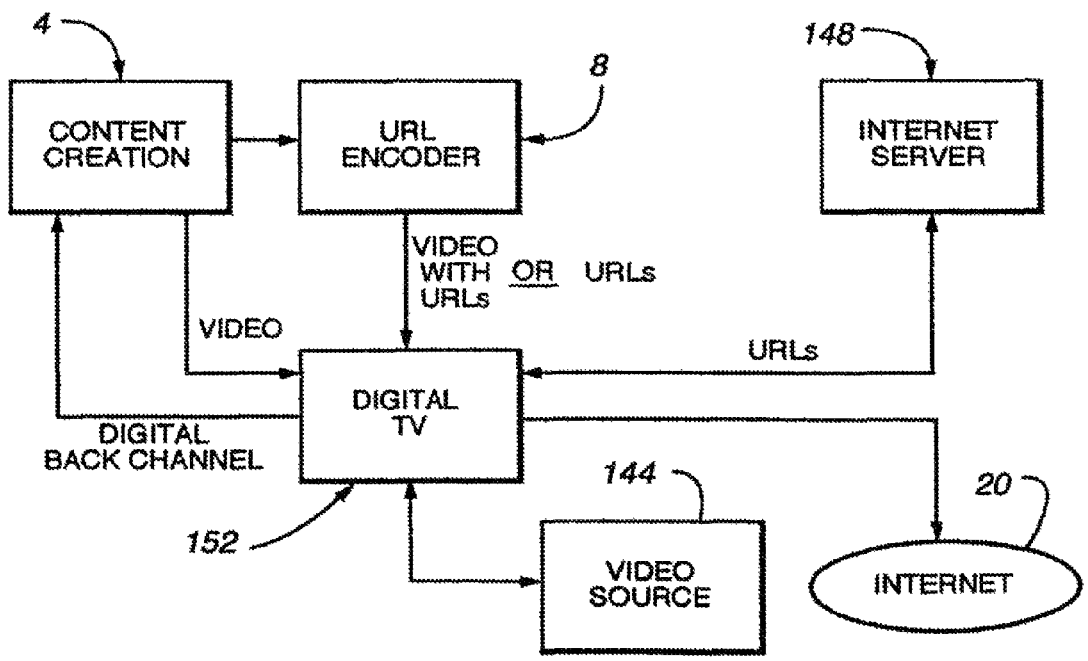
FIG. 6 is a diagram of another preferred embodiment including a digital T.V.

FIGS. 5 and 6 show two alternative embodiments for use with the present invention. For example, the user can view the interactive program using a television set 18 or other display monitor in conjunction with a digital cable box 140, as shown in FIG. 5. In this embodiment, the digital cable box 140 performs the functions of the personal computer 16 shown in FIGS. 1, 2 and 4. In the embodiment shown in FIG. 5, the client software is stored in memory in the digital cable box 140. In one embodiment, the digital cable box 140 includes two tuners, thus allowing both the Web Page and the Video program to be simultaneously viewed on the same screen. If Video and Webstream, however, are carried on one channel, then only one tuner is necessary.

The client software retrieves URLs from the received video program, directly from the Internet connection 20 or via a separate data channel, interprets these URLs and directs the Web enabled browser to retrieve the particular relevant Web pages, and synchronizes the retrieved Web pages to the video content for display on the television 18, as shown in FIG. 5. In this embodiment, the relevant Web pages are preferably shown in one frame of the television 18 while the video program is displayed in another frame. Alternatively, the web page can replace the video program on the display.

In this alternative embodiment, the digital cable set top box 140 receives the television program from the multichannel cable. The URLs can be encoded into the digital program channel using MPEG1, MPEG2, MPEG4, MPEG7 or any other compression video scheme. Alternatively, the URLs can be transmitted to the digital cable boxes 140 from an Internet server 148. The digital cable box 140 decodes the URLs from the digital video signal or directly transmitted over the Internet 20. The client software decodes the URLs and retrieves the particular Web pages as described above. The Web pages are then preferably synchronized with the particular video frames and presented to the user.

As with all the embodiments described above, instead of receiving the video program from a transmission means, the video program can be addressed directly from a local video source 144 if the video program, with or without embedded URLs, is stored on a VHS, Beta, DVD or other medium. In this embodiment, the digital cable box 140 is connected to a VCR, DVD player or other appropriate device.

FIG. 6 discloses an embodiment where a digital TV 152 is the remote reception unit. In this embodiment, the digital TV 152 performs the functions of the personal computer, shown in FIGS. 1, 2 and 4, and the digital cable box 140 shown in FIG. 5. In the embodiment shown in FIG. 6, a processor means and memory are incorporated into the digital TV 152. Further, the client software and Web browser software are implemented into memory in the digital TV 152. All of the functions described above with reference to the other embodiments are performed in a similar manner by the digital TV 152 embodiment.

Although the digital cable box/TV 140, 18 and digital TV 152, shown in FIGS. 5 and 6, are incorporated into the embodiment of FIG. 1, in substitution for the PC 16, they also could be substituted for the PC 16 shown in FIGS. 2 and 4.

The user can view the video and web content on one screen (in two windows), or with the video on one display screen and the Web content on a separate display monitor. Alternatively, the user can access the video or web content separately. Thus, the user can branch from video to web content and vice versa.

Figure 7:
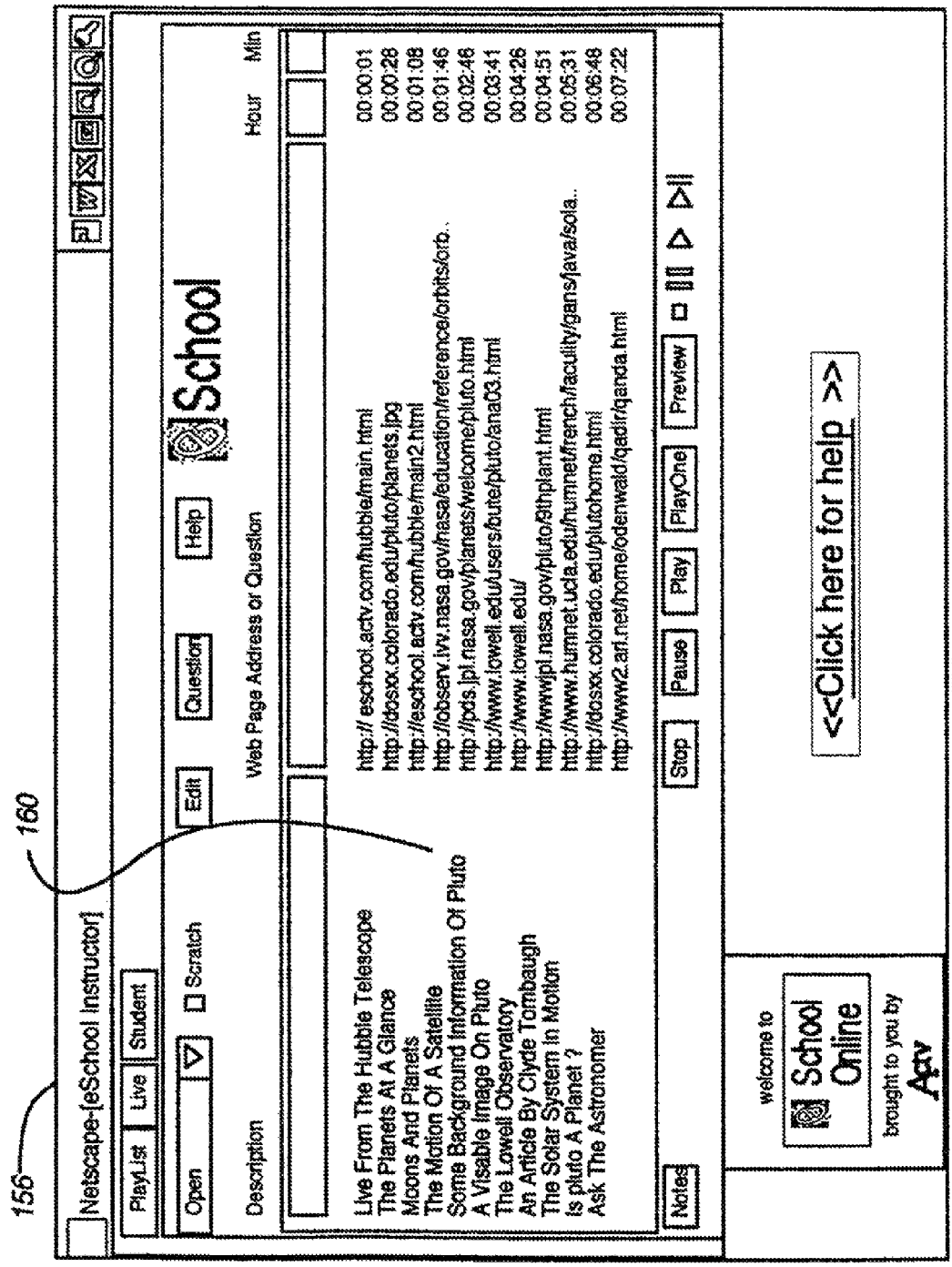
FIG. 7 is a diagram of a user interface illustrating a playlist.

The present invention is well-suited to the education environment. In this embodiment, students and teachers access one or more Web servers. The software components include instructor and student user software, authoring software and database assessment software. In one such embodiment, an instructor uses content creation software on a personal computer to easily integrate into their curriculum current information published on the Web, through an easy to use interface 156 such as that shown in FIG. 7. The instructor creates a playlist (i.e. linkfile) 160, the playlist 160 comprising a listing of Web pages, text notes and questions. The Web sites and questions are set forth in a predetermined order and can be assigned times. Preferably, the URLs identifying the Web site and time stamps are sent automatically to the desktop of each student in the virtual community, either during playback of a pre-recorded program or during a live event.

At each of the student workstations, the program is directed by the playlist 160. In other words, the playlist 160 provides the structure for the program. At predetermined times as dictated by the playlist 160, the browser will go fetch and display a Web page in a frame on the computer screen. Because program events can be set up in this manner at predetermined times, the entire program and playlist can be prerecorded and stored in a Web database for later access by students.

A significant advantage of an embodiment for educational applications is that the students and the instructor can be located anywhere, as long as they are all connected to the Web. Because a server is essentially controlling the program, the instructor output comes from the server and the student workstations get automatically updated by the Web server.

This educational embodiment integrates Web content and other media with collaborative groupware functionality to create an interactive environment for students and teachers. In this embodiment, the student can receive a traditional video lesson through a frame in his or her Web browser, or from a television.

Figure 8:
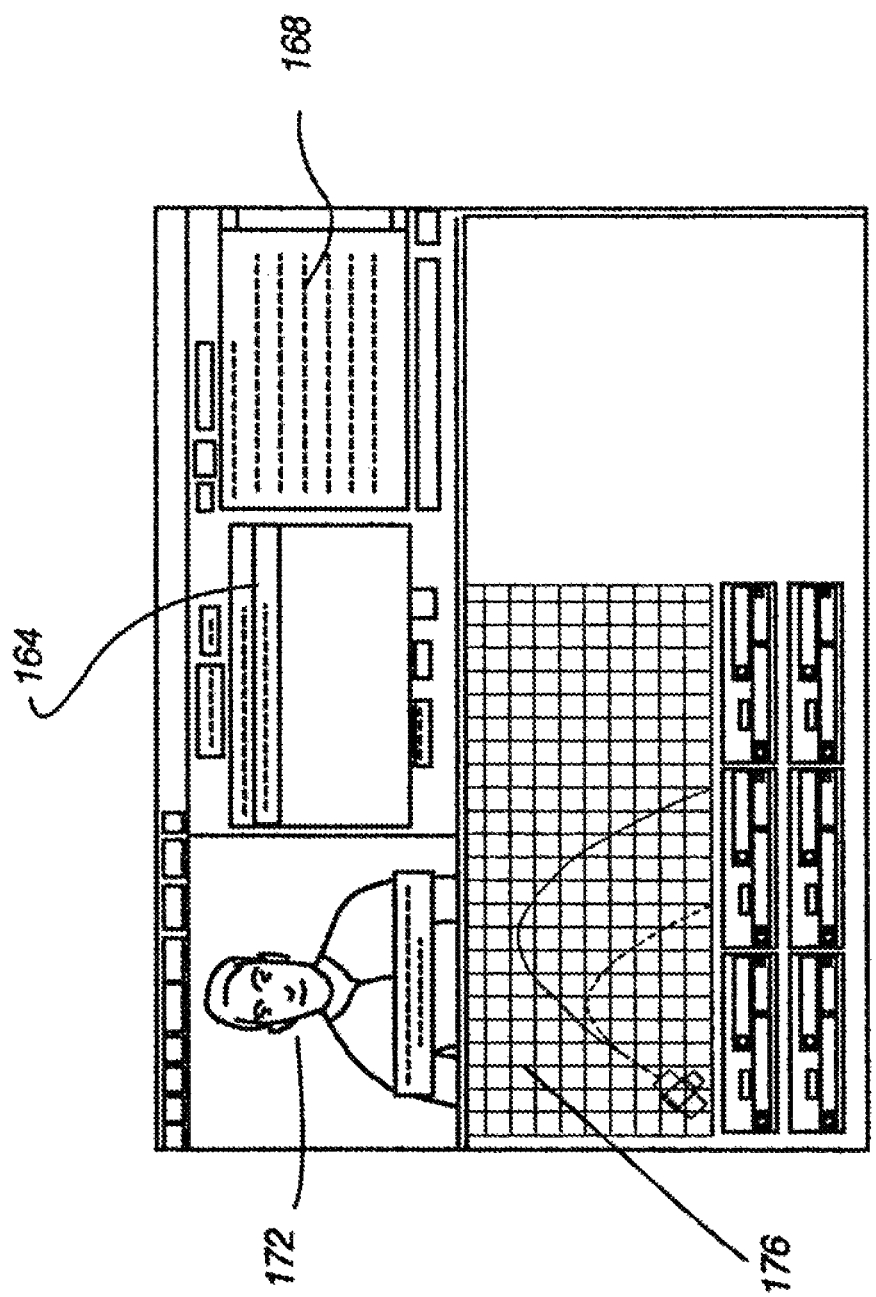
FIG. 8 is a sample display provided to a student of a lesson.

Simultaneously, the present invention provides separate frames, an example of which is shown in FIG. 8, in the browser displaying: (1) Web pages 176 automatically delivered to each student's desktop with information or exercises that complement the video presentation; (2) a chat dialogue frame 168 for conversing with the instructor and/or other students online; and (3), an interactive playlist 164 of Web pages and questions comprising the lesson.

In the student interface of FIG. 8, each student can perform a virtual experiment during a physics lesson to learn about gravity, for example. Further, the students are conversing with one another and the instructor in the chat dialogue frame 168. They may also send Web pages to one another and provide answers to questions from the teacher via the chat dialogue frame 168 of the student interface 176. With the chat feature, students may break into subgroups for collaborative learning. Whenever a student in the group sends a message, the message is sent to the Internet server 20 and every other student in the subgroup receives and views the message in their Chat dialogue frame 168.

The instructor, however, may retain control over the chat feature. For example, the instructor can terminate the chat feature or web pushing to terminate unruly on-line conversations or the sending of Web pages by students.

Unlike conventional distance learning systems, systems consistent with the present invention are more powerful by allowing the instructor to freely and conveniently exercise almost any type of testing strategy. The instructor can test students using a combination of the Chat dialogue feature and Web pages. For example, multiple choice questions and short answer questions can appear in the Chat window 168. Essay questions, requiring longer answers, become Web pages. As mentioned above, students can perform virtual experiments on-line. Once the instructor's personal computer receives student answers, student scoring can be presented to the instructor in any format including tables, charts, diagrams, bar graphs, etc. The instructor, thus, can analyze the results and has the capability of providing real-time feedback to the students.

Students can also receive individualized feedback via branched interactive audio, video and/or graphics responses. For example, the workstation may branch to a particular audio response, preferably prerecorded in the instructor's own voice, based on the student response to a multiple choice question. In this embodiment, a plurality of potential audio responses are made available at the student's workstation according to any one of the methodologies set forth in U.S. Pat. No. 5,537,141, entitled DISTANCE LEARNING SYSTEM, herein incorporated by reference. Alternatively, personalized video, audio and graphics segments can be delivered and displayed to the student based on a student answer or personal profile in the manner set forth in U.S. Pat. No. 5,724,091, entitled COMPRESSED DIGITAL DATA INTERACTIVE PROGRAM SYSTEM, herein incorporated by reference.

Responses to student answers can be more substantive based on the memory feature of the system. The memory feature is an algorithm that selects an interactive response to the user based not only on the student's current answer selection, but also his or her previous responses, as discussed in the aforementioned applications. The algorithm, preferably stored in memory at each student's workstation and under processor control, merely selects an output interactive response based on student responses. As another example, if a student gets three answers in sequence right, he or she receives a more difficult question. If, however, the student misses one or more of the three questions, he or she receives an easier question.

Figure 9:
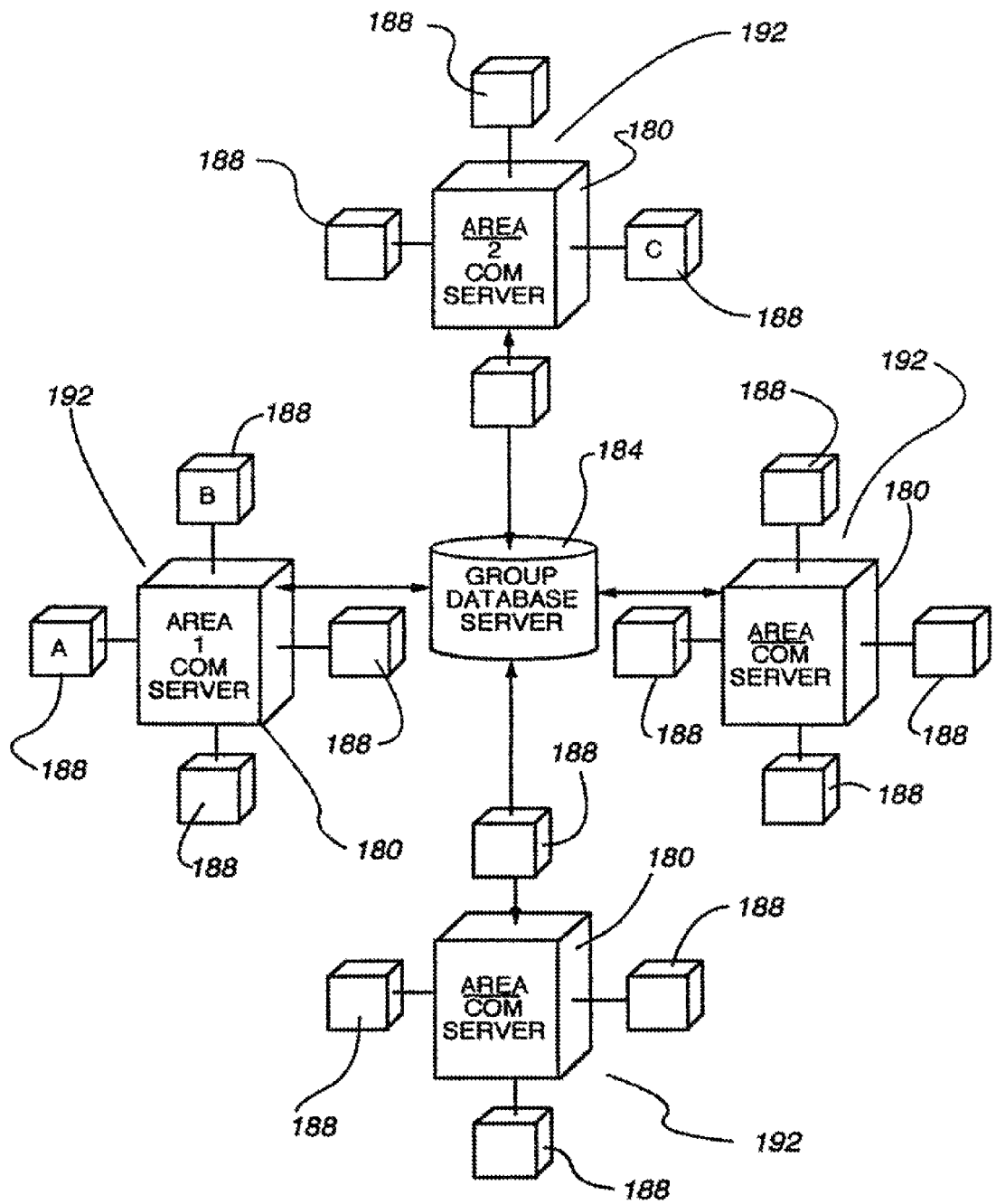
FIG. 9 is a diagram of the distributed Com Server embodiment.

In another embodiment of the present invention, a system is described capable of handling the education requirements of several schools in an efficiently designed network. The system shown in FIG. 9 solves the problems inherent in attempting to service large numbers of users, the most obvious obstacles being the issues of load and performance. In this embodiment shown in FIG. 9, communications servers 180 distribute and route messages across a LAN, WAN and the Internet. Referring to FIG. 9, in the center of the diagram is the Group Database server. Surrounding the database server are several Com Servers 180, each serving an area 192. Surrounding each Com Server 180 are squares representing user stations 188. The Communication Servers 180 are organized in node relationships with one another.

Each node is responsible for serving an Area 192. An Area 192 is defined as a Virtual location serviced by a single Communications Server 180 (or "Com Server"). An Area 192 may be a single school, an office, or may consist of several actual physical locations. The defining characteristic of an Area 192 is that messages sent from one member of an Area 192 to another need not be routed outside of the servicing Com Server 180.

An Area member is analogous to the frequently used term "user." For example, a "user" may be a student in the educational embodiment described above with reference to FIGS. 7 and 8.

The Distributed Communication System of FIG. 9 shall permit the dynamic addition of Communication Servers 180 within a group with little or no administrative tasks as well as the addition of groups within an overall communications network. A Communication Server group consists of several defined Virtual Areas 192 (preferably, consisting of no more the 250 members each), each area 192 serviced by a single Com Server 180. This system shall allow members of one Area 192, or group to easily communicate with members of another Area 192 or group without any configuration changes.

Generally, service of very large numbers of users has required large expensive servers and networks. As the user base increases, performance suffers and hardware must be upgraded to service the demand.

The Distributed Communication System of the present invention allows the same, relatively inexpensive machines to serve an ever-increasing user base. The technique by which this will be accomplished will be through the routing of messages from one server to another when necessary.

The method essentially follows the same core pattern as IP routing and DNS lookups. If a message is for a member not belonging to the current Area 192 or group, the message shall be routed through the Distributed Communication System until its destination, or someone who knows the destination and can deliver the message, is found.

The destination will be cached so subsequent messages for that member or group may be more efficiently delivered.

Referring again to FIG. 9, if a message is posted by member "A" and is intended only for the members of group 1 the message shall never leave Area 1 Com Server. However, if the message is intended for members of Area 1 and the members of Area 2, the Area 1 Com server forwards the message to the group database server 184. The message shall be broadcast to the members of Area 1 and tagged in the database 184 as belonging to Area 2. The message is then routed to Area 2 and broadcast to Area 2 members. With this technique any member can potentially send a message to any other member. If the Area Com server 180 does not recognize the destination, the message is forwarded up the line. Each Com server 180 does not need to know about any other server 180. Messages are routed until they delivered. If undeliverable, the original sender is notified.

New Areas 192 can be added on the fly. When a new Com server 188 is added to the network, it registers itself with the database application. Henceforth, any message destined for the new Area 192 can be routed properly without altering the other Area Servers 180.

This method and system works for global messages or for user to user messages. Furthermore, new Groups may also be dynamically added. Once added, each new Group Database Server 184 registers itself with the existing database servers 184. This distribution of load permits nearly unlimited expansion with existing software and hardware. Each server manages a finite number of members, cumulatively serving a growing community.

Users need not be informed as to the particular Com Server 180 they should connect to. Members are directed to a single URL. The selection of the server for user connection is determined by load balancing software. In this manner, the network may appear to be a global network of Servers or simply a local classroom.

The unique aspects of this architecture, using database servers as routing gateways, using techniques resembling IP routing and DNS lookup, enables this system to serve with minimum administration and configuration and with lower end, cost-effective hardware.

Donut Structure and Use

Another embodiment consistent with the present invention specifies a "donut" of dynamic, hierarchical, shared user-profile information. A donut may specify the following: user characteristics, viewing preferences, hobbies, and spending habits. The donut contains a user profile or acts as a key to a data repository containing it, and it may be stored in a file-type structure on a computer-readable medium such as a memory. The donut is accessed by browser programs, associated web server programs, and other applications for use in routing content to the user's machine associated with the donut. The user machine may include a wide variety of devices such as, for example, a personal computer, a television, a cable box, a satellite box, video game console, and a personal digital assistant.

Browser programs typically include a file created by a web server to locally store data and track web sites, identified by URLs, accessed by the user through the browser program. These files are referred to as cookie files, which contain a range of URLs for which they are valid. When the browser encounters the URLs again, it sends the corresponding cookie files to the web server identified by the URLs.

In the present invention, browsers may access a donut file or database structure storing donuts, and web servers may include files or other database structures for storing copies of the donut. The donut file for a particular user is typically stored only on the server but could be stored locally on the user's machine or on both the server and the user's machine. The donut thus implements a dynamic store of shared profile data that is exchanged between client and server, with the flexibility to collect and process that data in three ways: client-side evaluation, http-based server-side evaluation, and network-based server-side evaluation. The donut has an advantage over a cookie file in that the donut file is database driven and typically stored on a server, preventing a user from deleting or otherwise tampering with the donut file. Cookie files, in comparison, are stored locally on a user's machine. In addition, by storing a donut file on a server, a user may log onto a network from any machine and still access the user's donut file and receive content based upon the donut file.

A donut, more specifically, is an hierarchical attribute value pair data structure including a collection of crumbs. A crumb is the smallest unit of data corresponding to a meaning value pair associated with a particular donut. For example, a user's age would be a crumb associated with the user's primary donut. The donut data structure includes names plus associated crumbs. At the top level of the hierarchy, a top donut is associated with a user, a chat room, a network service, or other appropriate business entity or service. Each donut contains a set of crumbs and a set of sub-donuts.

A sub-donut is a donut associated with another donut rather than an external entity such as, for example, a user. An example of a sub-donut is a user's address. The user's address references the user's primary donut and is stored in a sub-donut, and the sub-donut contains crumbs for each piece of information in the address. Donuts are stored with hierarchical relationships, meaning that a donut can have associated sub-donuts and the sub-donuts can also each have associated sub-donuts. The donut thus may have many levels of sub-donuts within its hierarchical structure.

Some donuts are owned by only one parent donut. Other donuts are shared among several or many parent donuts. These shared donuts profile a business entity, such as an individual program, that is common to all; an example includes members of the same chat room. This provides a way to identify a group of users for a chat service. Also, by sharing the donut a user need not enter a new profile for using different services; the services share and use the one donut.

Figure 10:
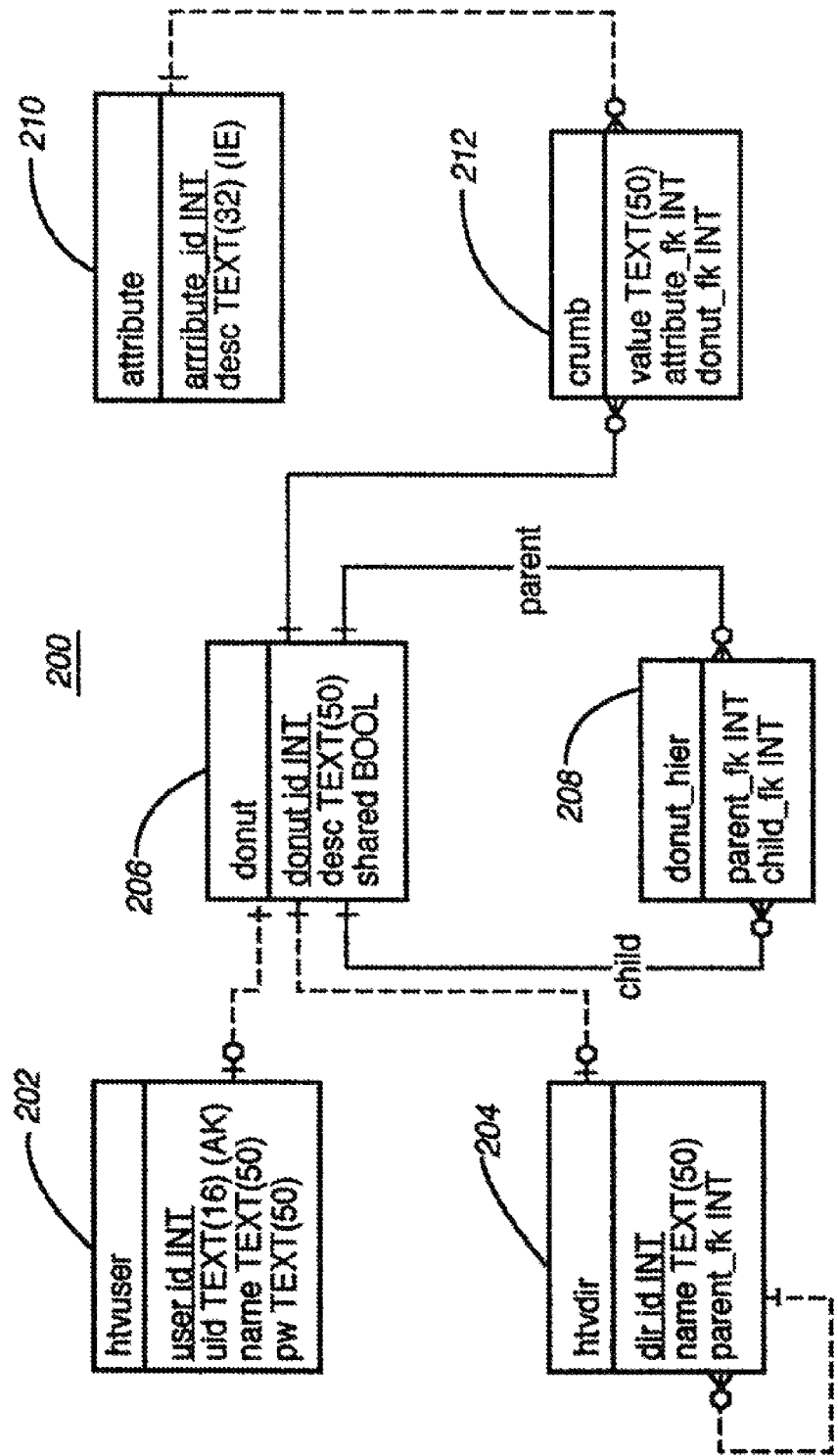
FIG. 10 is a diagram of logical structure of a donut for implementing user-profile information.

FIG. 10 is a diagram of logical structure 200 of a donut for implementing user-profile information. This structure may be stored on a computer-readable medium, such as a memory, for access by an associated machine. The term "donut" is used only as a label and refers to information residing on a server and accessible by a client for use in pushing or assigning particular content to the client.

Structure 200 uses database tables for storing and maintaining the user-profile information, which includes any type of information identifying a user or corresponding client machine. Structure 200 includes a user table 202, identifying a particular network user, and each user would typically be identified by a separate table. Table 202 may also include information identifying each user's name and an associated password and identification (ID). A directory table 204 maintains a directory listing of the network users.

A separate donut table 206 maintains user-profile information for a particular user. Donut table 206 is associated with the corresponding table 202 for that user and with the directory table 204. Donut table 206 is also associated with a donut hierarchy table 208, which identifies and maintains hierarchical relationships for table 206. Each donut table 206 may include an associated crumb table 212 for use in identifying and maintaining particular attributes for the user-profile information. An associated attribute table 210 stores and maintains the information for those attributes.

The user profile may contain a wide variety of information concerning user characteristics for use in determining content to push to a user. As further explained below, the content may include any type of information such as video, audio, graphics, text, and multimedia content. Examples of content to be selectively pushed to the user based upon the user-profile information include, but are not limited to, the following: advertisements; player profiles for sporting events; music or other audio information; icons representing particular services; surveys; and program suggestions. Also, when a video program provides different video streams for different camera angles, such as a sporting event, the particular camera angle may be chosen based upon the user profile. In addition, particular drama presentations provide different video streams for various plot changes, and a video stream for a particular plot to be displayed to a user may be chosen based upon the user profile.

The surveys may involve selectively transmitting questions to a user based upon the user's donut. The user's answers to the questions may be used to further update the donut. As an example of survey content, consider an automobile manufacturer as an advertiser that has determined that the answers to ten questions, asked in a specific order, are vital to determining how the manufacturer is going to market to a particular user. In this example, the server or network uses the donut to maintain what questions have been answered and which have not been answered. The donut can be utilized to determine which of the ten possible questions should be pushed to the user when the network determines, according to a particular schedule, that it is time for the manufacturer's survey to be pushed to the user.

This example further illustrates how individual advertising may be selected for particular users. The answers to the surveys may be used to provide a second level of information within an advertisement pushed to a particular user. The network may use demographic data in the user's donut, for example, to determine which advertisement and survey to push to the user. The user's answers to the questions in the survey may be used to push additional advertisements to the user or additional content for the advertisement already pushed. Also, the network can tailor a survey to a particular user by selecting additional questions for the survey, and an order of presentation of the questions, based upon the user's answers. Accordingly, the network can dynamically modify and update a user's donut to further fine-tune the processing of selecting particular content to push to the user based upon the user's donut.

An execution environment for donuts may be implemented with an easily programmed JAVA module, an example of which is provided in Table 1 illustrating template-based code, generated by a graphical user interface (GUI). This module may be implemented as an application program interface (API) on a user's machine for accessing the user's donut file on a server. If the user's machine does not contain such a module, the user's machine may download it as a JAVA Archive (JAR) file for local execution.

TABLE 1

```
import actv.nub.* ;
public class PilotYankees implements Processor {
    public void process(Nub nub, Donut client, Donut action)
      throws NubException
    {
      if (client.check("OWNS_PILOT") &&
          action.getValue("FAN_OF").equals("Yankees") ) {
        nub.change("content", YankeePilotChallenge);
      }
    }
}
```

The module in Table 1 can obtain crumb values from a donut service, branch on those values and other conditions, set existing crumb values, and create new crumbs as desired. Additionally, the module can interact directly with systems such as a distributed community network for additional functionality, including dynamic assignment to content and advertising push channels. An example of a distributed community network is disclosed in U.S. application of Craig D. Ullman, Michael R. Abato, Jeffrey M. Harrington, and Carl R. Duda, entitled "ENHANCED VIDEO PROGRAMMING SYSTEM AND METHOD FOR PROVIDING A DISTRIBUTED COMMUNITY NETWORK," and filed on Sep. 15, 1999. The donut may be used with other types of networks as well.

A module processing a donut can execute in three modes: as an http servlet connected directly to a database for donut persistence; as a service responding to requests coming through a distributed community network and unconnected to a database for donut persistence; and on the client machine, which has direct access to user input, but uses the donut persistence by proxy through a distributed community network.

Figure 11A:
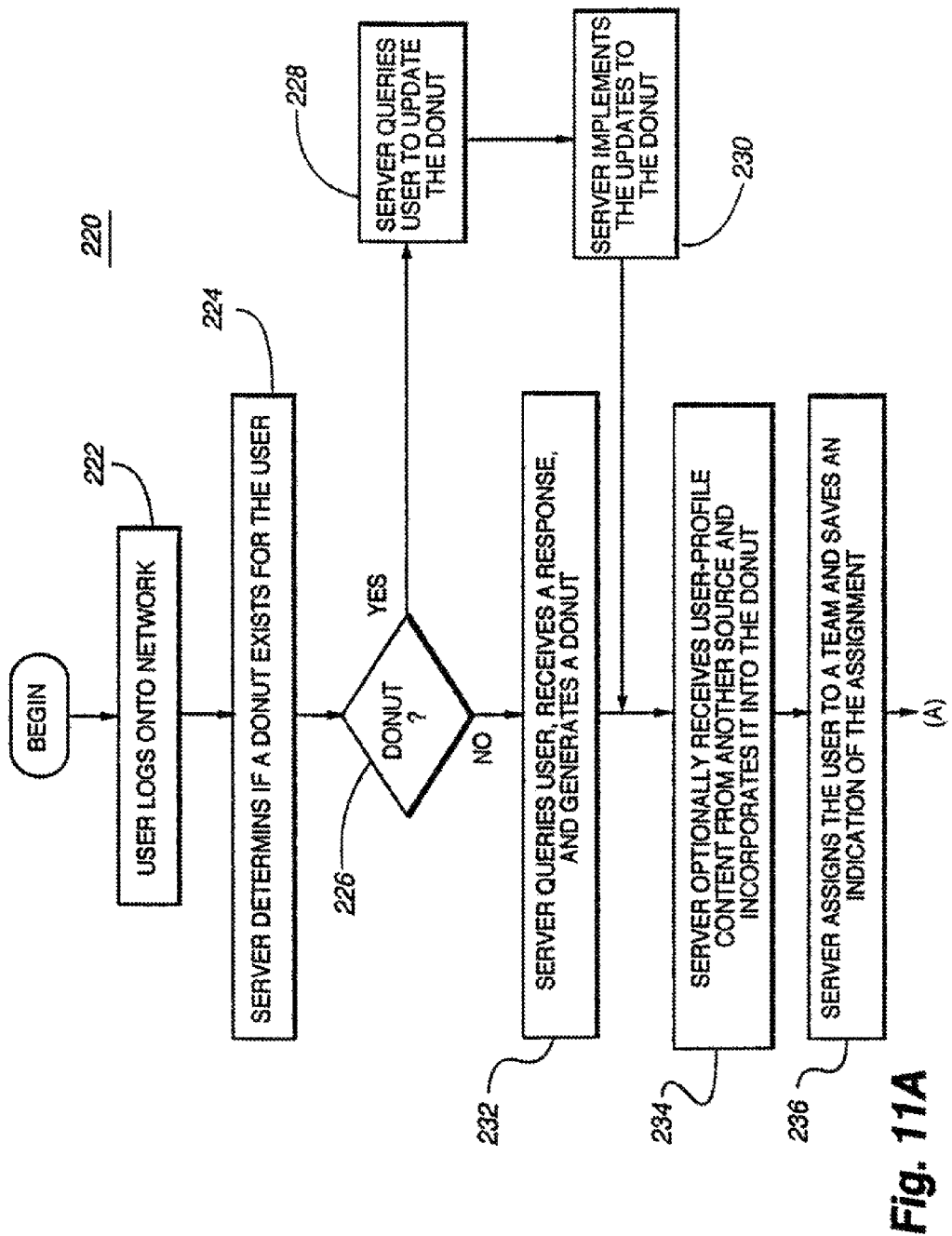
FIGS. 11A, 11B, and 11C are a flow chart of a process for generating and implementing donuts specifying user-profile information.
Figure 11B:
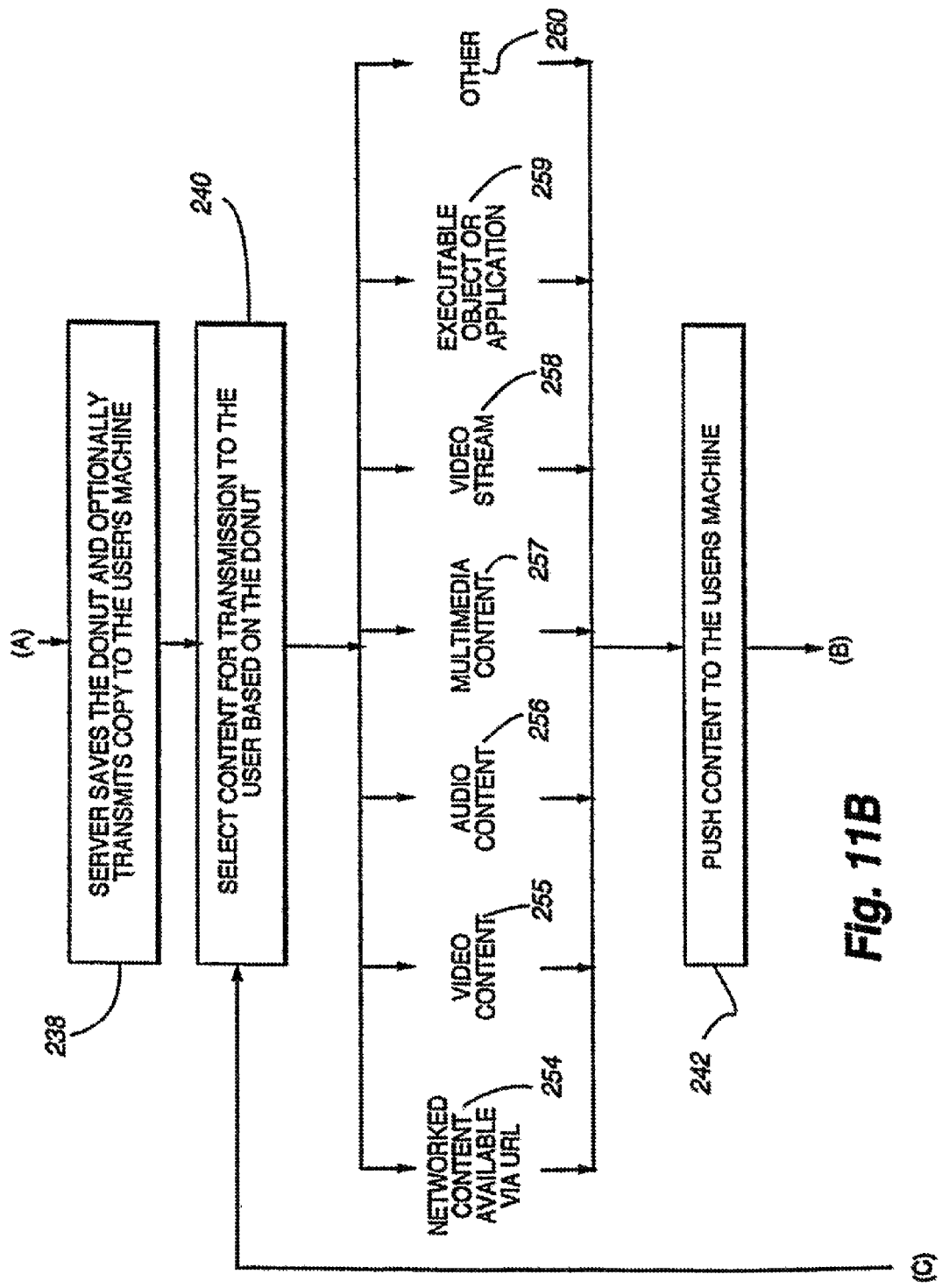
Figure 11C:
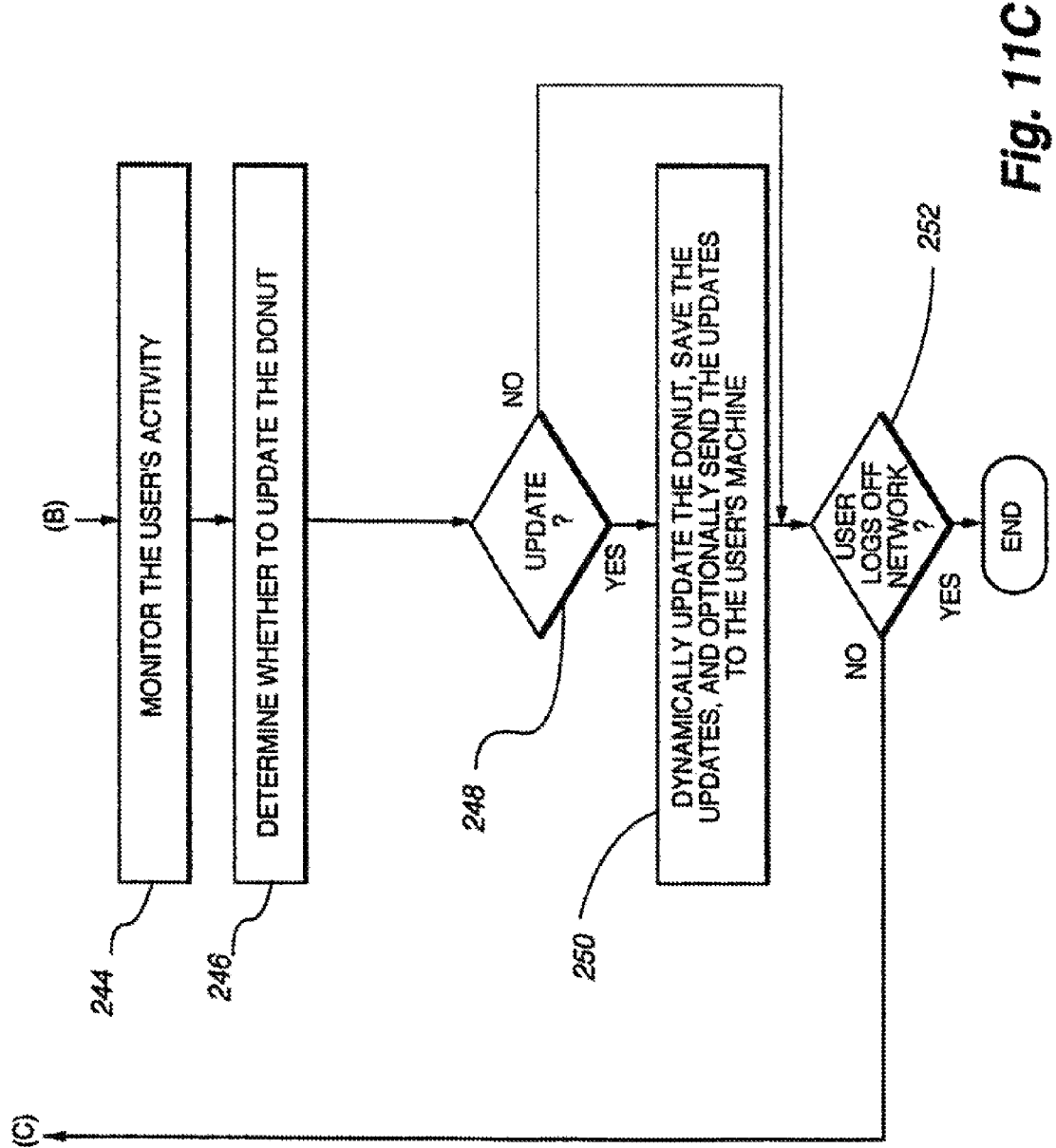

FIGS. 11A, 11B, and 11C are a flow chart of a process 220 for generating and implementing donuts specifying user-profile information. Process 220 may be implemented in software modules on a machine such as a web server in the exemplary network described above. In process 220, a user attempts to log onto the network (step 222). In response, the server determines if a donut exists in the database for this user (step 224). If a donut does not exist (step 226), the server queries the user, receives a response to the query, and generates a donut for the user based upon the response, using exemplary database structure 200 (step 232). An example of a query is provided below. Otherwise, if a donut does exist for the user (step 226), the server queries the user in order to update the donut (step 228) and implements the updates to the donut, using exemplary database structure 200 (step 230). The queries may involve the server transmitting a series of questions to the user and receiving from the user replies to the question. The queries may also involve survey questions as described above. The server may require a response in order for the user to receive content from the network.

The server may optionally receive user-profile content for the user from another source. For example, a user profile may already exist for the user from another network-based system, and the server may receive that profile. Upon optionally receiving the other user-profile content, such as a pre-existing user profile, the server selectively incorporates the content into the donut (step 234). The server may base the incorporation of the pre-existing other user-profile content on particular criteria such as the types of content required for the user profile and when the pre-existing user profile was updated. In addition, the server may incorporate all of the content or only selected portions of it.

The server assigns the user to a team based upon the user's donut and saves an indication of the assignment in the user's donut (step 236). A team specifies a chat room for this user for a chat service; the donut information may be used with other network services as well. If the user already had a donut in the system, the server may use a pre-existing room assignment as a default assignment, or assign the user to a new team, particularly if the user's donut has been substantially updated. The server stores the user's donut in the database and optionally transmits a copy of the donut or particular portions of it for storage on the user's machine (step 238). The user's machine, if it receives the donut, locally stores the donut or the updates to it.

After creating or updating a donut for the user, the server selects content for transmission to the user based upon the user-profile information stored in the user's donut (step 240). The selected content may be based upon particular criteria involving the user-profile information in the user's donut, and it may include a wide variety of types of information. The content may include networked content, meaning any type of information available via a Uniform Resource Identifier (URI) (step 254). A URI is a compact string of characters for identifying an abstract or physical resource. More specifically, URIs provide a simple and extensible means for identifying a resource, and a URI can be further classified as a locator, a name, or both. The specification of URI syntax and semantics is derived from concepts introduced by the World Wide Web global information initiative. URIs include, for example, URLs and Uniform Resource Names (URNs). A URL is a subset of a URI that identifies resources via a representation of their primary access mechanism, such as their network "location," rather than identifying the resource by name or other attribute of that resource. The term URN refers to a subset of URI that is required to remain globally unique and persistent even when the resource ceases to exist or becomes unavailable.

The selected content may also include video content (step 255); audio content (step 256); or any type of multimedia content (step 257). The multimedia content may include, for example, particular types of animations or slide shows selected for transmission to the user's machine based upon the user's preferences or characteristics as identified in the user's donut. The video and audio content may include, for example, particular video and audio advertisements potentially of interest to the user and selected for transmission to the user's machine based upon the user's identified preferences. The video, audio, or multimedia content may include content related to a chat room discussion among the user and other members of the user's chat room or team. It may also include content related to a program being viewed by the user. For example, if the user views a sports program, the content may include statistics or videos of past sports programs between the same teams or players, depending on the user's identified preferences or interests as saved in the user's donut.

The selected content may also include a particular video stream, as identified above (step 258). In particular, several video streams captured from different camera angles may be available for a particular program. The server may select a video stream for display to the user based upon the user's stated preferences. For example, a user may have stated a preference for watching the quarterback during a football game and, therefore, a video stream following the quarterback is selected for transmission to the user's machine. Another user may have expressed an interest in watching wide receivers, for example, and a video stream of the receivers is selected for transmission to that user's machine. Technology for providing multiple video streams of a program is disclosed in U.S. Pat. No. 5,861,881, which is incorporated herein by reference.

The selected content may also include an executable object or application (step 259). For example, the server may transmit to the user a JAVA game or other types of electronic games based upon the user's preferences. The executable objects may also be used to dynamically push customized code to the user's machine while another application executes. In addition, selected executable objects may be used to facilitate electronic commerce transactions. In particular, identification of particular products available for purchase may be transmitted to the user based upon the user's preferences, and an executable object can be used to provide a common electronic "shopping cart" where the user can drag and drop identification of products to purchase among multiple vendors. The electronic shopping cart saves an identification of the products, and potentially other information, for use in transmitting and executing a purchase request for the products.

The selected content can include other types of content as well (step 260). Based upon the determination, the server pushes the particular content to the user's machine (step 242).

The server also monitors the user's activity in order to dynamically update the user's donut (step 244). The user's activity may involve any type of information relating to the user's interaction with the network or program content provided to the user. For example, the server may detect the following: the rate at which the user selects or "clicks on" URLs to request particular content; which URLs the user selects; the amount of elapsed time the user has remained logged onto the network; the extent to which the user participates in chat room discussions; and any other such information.

The server also determines whether to update the user's donut based upon the monitored user activity (step 246). This determination may be based upon particular criteria related to the user's activity. For example, the server may store particular types of activity or thresholds for activity and compare them to the user's monitored activity, providing for an update when the user's activity matches the particular types of activity or exceeds the thresholds. It may also be updated based upon survey questions. If the server has determined based on the criteria that the user's donut is to be updated (step 248), it dynamically updates the donut based on the user's activity, saves the updates, and optionally sends the updates to the user's machine (step 250). Otherwise, if the criteria have not been met, the server does not update the donut.

The server also detects whether the user has logged off the network (step 252). If the user remains logged onto the network, the server continues to select and push content to the user based upon the user's donut (steps 240, 242, 254-260), monitor the user's activity (step 244), and dynamically update the user's donut (steps 246, 248, and 250).

The following provides an example of use of a donut. During a program, the server sends a user, Bob Smith, a question which states, "Do you own a Personal Digital Assistant (PDA)?" Bob returns a "Yes" answer. The corresponding crumb includes the meaning value pair PDA=True, which is then sent via the Internet to a distributed community network, as identified above. This crumb is captured from the distributed community network and stored in the database as a crumb in the sub-donut "Technology" under Bob Smith's donut. A copy of the crumb is stored locally in the client browser on Bob Smith's machine.

Later in the program, the host of the television program is reviewing the latest PDAs. The producer of the program wants to send web content specific to all the users on-line about PDAs. The producer pushes to all the users on-line a playlist item, as identified above, parameterized on whether a user has a PDA. Bob Smith's browser receives the playlist item, which references his donut. The browser recalls the value pair PDA=True, and from the logic in the playlist item, determines that Bob should see in his browser a web page that offers a discount on a PDA upgrade, rather than a web page that offers the user the opportunity to buy a new PDA for the first time.

In addition to this route of the crumb and the decision making occurring on the client side, the same process can occur solely on the server side. Table 2 provides an Extensible Markup Language (XML) code listing for an exemplary donut. Table 3 provides an XML code listing for an exemplary collection of donuts. In Tables 2 and 3 the indentation represents the hierarchical structure of the donuts.

TABLE 2

```
<?xml version,"1.0" encoding="UTF-8"?>
<!DOCTYPE htvuser SYSTEM "donut.dtd" [ ]>
<htvuser name="Bart Simpson" uid="bart" pw="dude!">
   <donut desc="bart" id="bart">
      <crumb desc="email" value="barf@fox.net" />
      <crumb dest="ccn" value="amex 5592 3800 0165 1872 exp 01" />
      <donut desc="thebox">
         <crumb desc="style" value="rock" />
         <crumb desc="region" value="NE" />
         <crumb desc="fanof" value="Offspring, Limp Bizkit" />
         <crumb desc="sex" value="yes" />
      </donut>
   </donut>
</htvuser>
<!--
Client code can refer to:
   bart.ccn
   bart.thebox.region
   bart.thebox.fanof
   etc.
-->
```

TABLE 3

```
<?ml version="1.0" encoding="UTF-8"?>
<!DOCTYPE teamlist SYSTEM "donut.dtd" [ ]>
<teamlist>
   <donut       desc="team"
                id="hot-sax-mets"
                shared="true"
                members="lisa,sally,lukas">
      <crumb desc="name"
         value="Hot Saxophonists Lusting after the Met's Shortstop" />
      <crumb desc="team-homepage"
         value="http://home.springfield.net/~lisa/mitt-lusters.html" />
      <crumb desc="trivia-tries" value="22" />
      <crumb desc="trivia-correct" value="5" />
      <crumb desc="trivia-prizes" value="05" />
   </donut>
   <htvuser name="Sally Brown" uid="sally" pw="beethoven"">
      <donut desc="sally" id="sally">
         <crumb desc="email" value="sally@shulz.net" />
         <crumb desc="cnn" value="mc 5592 3800 0165 1872 exp 012" />
         <donut desc="espn" subs="hot-sax-mets">
            <crumb desc="sports" value="skiing" />
            <crumb desc="agegroup" value="2-5" />
         </donut>
      </donut>
   </htvuser>
   <htvuser name="Lisa Simpson" uid="lisa" pw=""trane ">
      <donut desc="lisa" id="lisa">
         <crumb desc="email" value="lisa@fox.net" />
         <crumb desc="ccn" value="visa 5592 3800 0165 1872 exp 02" />
```

TABLE 3-continued

```
         <donut desc="espn" subs="hot-sax-mets">
            <crumb desc="sports" value="curling,wwf" />
            <crumb desc="agegroup" value="5-1 0" />
            <crumb desc="education" value="Springfield" />
         </donut>
      </donut>
   </htvuser>
   <htvuser name="Lukas Doright" uid="duanne" pw="tomgirl">
      <donut desc="lukas" id="lukas">
         <crumb desc="email" value="lukas@aol.com" />
         <crumb desc="ccn" value="amex 5592 3800 0165 1872 exp 00" />
         <donut desc="espn" subs="hot-sax-mets">
            <crumb desc="sports" value="baseball" />
            <crumb desc="agegroup" value="18-24" />
         </donut>
      </donut>
   </htvuser>
</teamlist>
```

Using the foregoing embodiments, methods and processes, the system of the present invention creates a synergistic experience combining the vast resources of the Internet with the presentation capabilities of television.

The invention claimed is:

1. A method of providing media content via a network, the method comprising:
   accessing a user profile and a group profile, wherein the user profile comprises information describing a user of media content, and wherein the group profile comprises information describing a group of users of media content;
   assigning, based on the information of the user profile, the user profile to the user group, wherein the assigning comprises linking the user profile as a child profile to the group profile;
   determining, using at least one hardware processor, based on the information of the user profile and on the assigning of the user profile to the user group, an item of media content to transmit to a user device of the user; and
   transmitting, via the network, the item of media content to the user device.

2. The method of claim 1, further comprising:
   determining, prior to the accessing of the user profile, whether the user profile exists;
   transmitting, via the network, in response to determining that the user profile does not exist, at least one question to the user device;
   receiving, via the network, at least one answer to the at least one question from the user device;
   and storing information in the user profile based on the received at least one answer.

3. The method of claim 2, the at least one answer comprising a fact pertaining to the user.

4. The method of claim 2, the at least one answer comprising a preference of the user.

5. The method of claim 1, further comprising:
   updating the user profile to indicate the assigning of the user profile to the user group.

6. The method of claim 1, further comprising:
   monitoring, via the network, activity of the user; and
   updating the user profile based on the monitored activity of the user.

7. The method of claim 6, wherein the updating of the user profile occurs in response to the monitored activity matching at least one activity type.

8. The method of claim 6, wherein the updating of the user profile occurs in response to the monitored activity exceeding a threshold.

9. The method of claim 1, wherein the user group is a first user group, the group profile is a first group profile, and the method further comprises:
- accessing a second group profile, wherein the second group profile comprises information describing a second group of users of media content;
- assigning, based on the information of the user profile, the user profile to a second user group, the assigning of the user profile to the second user group comprising linking the user profile as a child profile to the second group profile;
- wherein the user profile remains assigned to the first user group.

10. The method of claim 1, wherein the user group comprises a business entity.

11. The method of claim 1, wherein the user group comprises a group of users corresponding to a chat room.

12. The method of claim 11, wherein the item of media content comprises media content related to a discussion among the group of users.

13. The method of claim 1, wherein the user profile comprises a plurality of attribute-values pairs.

14. A non-transitory computer-readable storage medium comprising instructions that, when executed by at least one processor of a machine, cause the machine to perform operations comprising:
- accessing a user profile and a group profile, wherein the user profile comprises information describing a user of media content, and wherein the group profile comprises information describing a group of users of media content;
- assigning, based on the information of the user profile, the user profile to the user group, wherein the assigning comprises linking the user profile as a child profile to the group profile;
- determining, based on the information of the user profile and on the assigning of the user profile to the user group, an item of media content to transmit to a user device of the user; and
- transmitting, via the network, the item of media content to the user device.

15. A system comprising:
at least one hardware processor; and;
memory comprising instructions that, when executed by the at least one hardware processor, cause the system to perform operations comprising:
- accessing a user profile and a group profile, wherein the user profile comprises information describing a user of media content, and wherein the group profile comprises information describing a group of users of media content;
- assigning, based on the information of the user profile, the user profile to the user group, wherein the assigning comprises linking the user profile as a child profile to the group profile;
- determining, based on the information of the user profile and on the assigning of the user profile to the user group, an item of media content to transmit to a user device of the user; and
- transmitting, via the network, the item of media content to the user device.

16. The system of claim 15, wherein the user is a first user, the user profile is a first user profile, the user device is a first user device, the item of media content is a first item of media content, and the operations further comprise:
- accessing a second user profile, wherein the second user profile comprises information describing a second user of media content;
- determining, based on the information of the second user profile, a second item of media content to transmit to a second user device of the second user; and
- transmitting, via the network, the second item of media content to the second user device.

17. The system of claim 16, wherein the first item of media content is different from the second item of media content.

18. The system of claim 16, wherein the first user device is of a different type from the second user device.

19. The system of claim 18, wherein the first user device comprises a first mobile device, and wherein the second user device comprises a second mobile device.

20. The system of claim 15, wherein the user device is a first user device, the item of media content is a first item of media content, and the operations further comprise:
- determining, based on the information of the user profile and on the assigning of the user profile to the user group, a second item of media content to transmit to a second user device of the user; and
- transmitting, via the network, the second item of media content to the second user device.

21. The system of claim 15, the operations further comprising:
- storing the user profile in a data storage device located remotely from the user device.

* * * * *